United States Patent
Ray et al.

(10) Patent No.: US 7,133,233 B1
(45) Date of Patent: Nov. 7, 2006

(54) DISK DRIVE WITH READ WHILE WRITE CAPABILITY

(75) Inventors: Charles D. Ray, Scotts Valley, CA (US); Gary Lee, Fairfield, CA (US); Tony Hurtado, Cupertino, CA (US)

(73) Assignee: Maxtor Corporation, Longmont, CO (US)

( * ) Notice: Subject to any disclaimer, the term of this patent is extended or adjusted under 35 U.S.C. 154(b) by 409 days.

(21) Appl. No.: 09/695,775

(22) Filed: Oct. 24, 2000

(51) Int. Cl.
   *G11B 5/02* (2006.01)
(52) U.S. Cl. .......................... 360/67; 360/46; 360/61; 360/75
(58) Field of Classification Search ................. 360/67, 360/69, 75, 46, 61–63, 77.08
   See application file for complete search history.

(56) References Cited

U.S. PATENT DOCUMENTS

| | | | |
|---|---|---|---|
| 3,846,829 A * | 11/1974 | Lin | 360/46 |
| 4,313,140 A * | 1/1982 | Keidl | 360/77.01 |
| 4,314,289 A * | 2/1982 | Haynes | 360/77.01 |
| 4,972,336 A | 11/1990 | Reid et al. | 360/128 |
| 4,979,056 A | 12/1990 | Squires et al. | 360/69 |
| 5,034,838 A | 7/1991 | Brock et al. | 360/122 |
| 5,153,787 A * | 10/1992 | Sidman | 360/77.05 |
| 5,255,136 A | 10/1993 | Machado et al. | 360/77.02 |
| 5,293,278 A | 3/1994 | Pahr | 36/67 |
| 5,363,100 A | 11/1994 | Bailey et al. | 341/132 |
| 5,477,402 A * | 12/1995 | Elliott et al. | 360/77.08 |
| 5,485,476 A | 1/1996 | Paranjape et al. | 371/47.1 |
| 5,521,945 A | 5/1996 | Knudson | 375/341 |
| 5,570,247 A | 10/1996 | Brown et al. | 360/75 |
| 5,587,850 A | 12/1996 | Ton-that | 360/77.08 |
| 5,596,458 A | 1/1997 | Emo et al. | 360/48 |
| 5,633,765 A | 5/1997 | Lin et al. | 360/46 |
| 5,640,583 A | 6/1997 | Assouad et al. | 395/800 |
| 5,668,679 A | 9/1997 | Swearingen et al. | 360/75 |
| 5,671,098 A | 9/1997 | Mathews et al. | 360/67 |
| 5,699,487 A | 12/1997 | Richardson | 395/22 |
| 5,760,635 A | 6/1998 | Nayebi et al. | 327/403 |
| 5,793,554 A | 8/1998 | Chainer et al. | 360/75 |
| 5,829,011 A | 10/1998 | Glover | 711/100 |
| 5,862,005 A | 1/1999 | Leis et al. | 360/27 |
| 5,875,064 A | 2/1999 | Chainer et al. | 360/75 |

(Continued)

FOREIGN PATENT DOCUMENTS

EP     0642081 A2 *   7/1994

(Continued)

OTHER PUBLICATIONS

IBM Technical Disclosure Bulletin; May 1, 1993; vol. No. 36, Issue No. 5, pp. 459-460.*

*Primary Examiner*—Andrea Wellington
*Assistant Examiner*—Dan I Davidson
(74) *Attorney, Agent, or Firm*—Tejpal S. Hansra

(57) ABSTRACT

A disk drive includes recording media having one or more recording surfaces, one or more transducer heads positionable relative to the recording surfaces by an actuator operating within a head position servo loop, and a data transfer driver. A preamplifier in the data transfer driver includes one or more head interfaces, each head interface for controlling a transducer head for read and write operations, and a mode controller for controlling each head interface based on configuration information for selectively (i) reading data from at least one recording surface, (ii) writing data to at least one recording surface, and (iii) simultaneously reading data (such as a reference pattern) from at least one recording surface and writing data (such as servo patterns) to at least one recording surface.

66 Claims, 15 Drawing Sheets

U.S. PATENT DOCUMENTS

| | | | |
|---|---|---|---|
| 5,949,603 A | 9/1999 | Brown et al. | 360/75 |
| 5,978,426 A | 11/1999 | Glover et al. | 375/376 |
| 6,091,559 A | 7/2000 | Emo et al. | 360/48 |
| 6,219,722 B1 * | 4/2001 | Tomita | 710/14 |
| 6,266,202 B1 * | 7/2001 | Nguyen et al. | 360/53 |
| 6,304,407 B1 * | 10/2001 | Baker et al. | 360/75 |
| 6,351,342 B1 * | 2/2002 | Elliott et al. | 360/77.08 |
| 6,411,459 B1 * | 6/2002 | Belser et al. | 360/75 |
| 6,567,233 B1 * | 5/2003 | Chew et al. | 360/77.05 |
| 6,693,760 B1 * | 2/2004 | Krounbi et al. | 360/75 |
| 6,704,156 B1 * | 3/2004 | Baker et al. | 360/75 |

FOREIGN PATENT DOCUMENTS

| | | | |
|---|---|---|---|
| EP | 0762756 A2 * | 3/1997 | |
| EP | 0784317 A2 * | 7/1997 | |

* cited by examiner

TO / FROM FIG. 5B

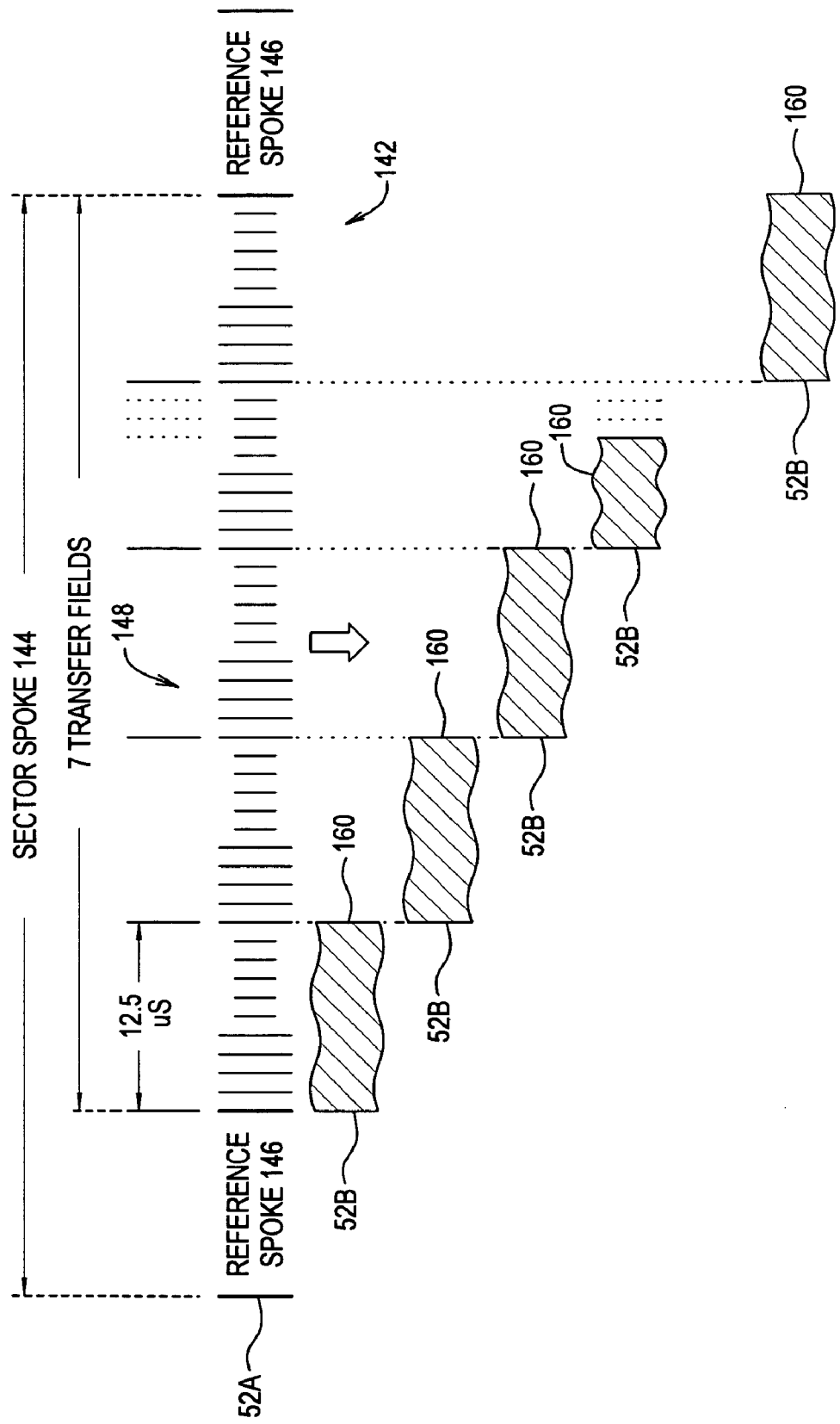

TO FIG. 14B

DISK DRIVE WITH READ WHILE WRITE CAPABILITY

FIELD OF THE INVENTION

The present invention relates generally to disk drives and in particular to preamplifiers for disk drives.

BACKGROUND OF THE INVENTION

Data storage devices such as disk drives are used for data storage and retrieval in a variety of applications. A disk drive includes a disk for storing information, a transducer (read/write) head for reading data from and writing data to the disk, a spindle motor for rotating the disk, a head carrier that supports the transducer head and an actuator for moving the head carrier and the transducer head. The disk drive may include multiple disks separated by spacer rings and stacked on a hub attached to the spindle motor, multiple transducer heads and multiple head carriers that each support at least one transducer head. The disk includes concentric tracks that each include servo sectors and interleaved data sectors. To access a data sector, the transducer head is moved radially across the tracks in a seek operation to the destination track that contains the data sector, and then the disk rotates the data sector under the transducer head for reading data from or writing data to the data sector.

The disk drive further includes a preamplifier connected to the transducer head. The preamplifier provides two mutually exclusive data transfer modes: a read mode in which data recorded on the disk is sensed by the transducer head and transmitted to the preamplifier for amplification in a read operation, and a write mode in which data transmitted to the preamplifier is recorded on the disk by the transducer head in a write operation.

The disk drive has timing constraints which limit performance due to the read and write operations being mutually exclusive (not overlapping or simultaneous). For example, the disk drive cannot (1) self-servo write by reading a reference pattern from one disk surface while writing servo patterns to another disk surface, (2) reprocess (erase) a previously written disk by reading from one disk surface while writing an erase pattern to another disk surface without an external positioning device or a time consuming algorithm, (3) reduce test time by reading from one disk surface while writing to another disk surface, (4) increase read accuracy by reading head position information from one disk surface while writing to another disk surface, or (5) increase write accuracy by reading from one disk surface while writing to another disk surface.

The servo patterns in the servo sectors provide head position information to enable the actuator to move the transducer head from the starting track to the destination track during a seek (track-to-track) operation, and to maintain the transducer head in proper alignment with the track centerline of the destination track while data is read from or written to the destination track during a track-following (on-track) operation. The servo patterns typically have uniform angular spacing and include circumferentially sequential, radially staggered single or multiple frequency bursts.

The servo patterns can be written using a servo writer. The servo writer is a complex and expensive machine typically stabilized on a large granite base to minimize unwanted vibration and employs laser interferometry for precise position measurements. The servo writer typically requires direct mechanical access to the head carrier and includes a fixed head for writing a clock track on a disk surface. The servo writer writes the servo patterns before the disk drive is sealed against particulate contamination.

The servo writer is typically located within a clean room where the air is purged of impurities that might otherwise interfere with the servo writing or normal disk drive operation after manufacturing. Further, servo writing by the servo writer is very time consuming. In one example, a disk drive having two disks with four disk surfaces can require three servo writer controlled passes of the transducer head over a single track, consuming a total servo writing time as long as 18.2 minutes. Servo writing using servo writers in clean rooms requires both considerable capital investment and severe time penalties attributable to servo writer bottlenecks. Further, as track densities increase with evolving disk drive designs, servo writers have to be replaced or upgraded at considerable capital expense.

The servo patterns can also be written using self-servo writing. A reference pattern at full resolution is magnetically printed on a disk surface of a reference disk by a magnetic printing station during a pre-assembly operation. The reference disk with the reference pattern is then assembled with blank disks into the disk drive. After the disk drive is sealed, the disk drive uses the reference pattern to self-servo write embedded servo patterns on each disk surface within the disk drive. Thereafter, the reference pattern is erased, leaving the disk drive with properly located servo patterns on every disk surface, including the disk surface which included the reference pattern. However, disadvantages of this approach include (1) the self-servo write is time consuming, (2) repeatable run-out must be removed during the self-servo write, (3) the magnetic printing station is expensive, and (4) the reference disk has no absolute reference and since read and write operations are mutually exclusive, defects in the reference disk can exacerbate the problem.

There is, therefore, a need for a data storage device, such as a disk drive, with simultaneous read and write capability. There is also a need for self-servo write with simultaneous read and write operations to cost effectively enhance data storage device manufacturing and performance.

SUMMARY OF THE INVENTION

The present invention provides a data transfer driver for a data storage device. The data transfer driver includes a preamplifier, and the data storage device includes a recording media having one or more recording surfaces, and one or more transducer heads positionable relative to the recording surfaces by an actuator operating within a head position servo loop. The preamplifier includes one or more head interfaces, each head interface connected to a transducer head for controlling the transducer head for data read and/or write operations, and a mode controller connected to each head interface for controlling the operation of each head interface for selectively reading from at least one recording surface via at least one transducer head while writing to at least one recording surface via at least one transducer head.

The preamplifier receives configuration information to selectively transfer data to and from recording surfaces such that the mode controller controls the operation of each head interface based on the configuration information.

The configuration information includes (1) a read mode in which the mode controller controls the operation of the head interfaces for selectively reading data via at least one transducer head, (2) a write mode in which the mode controller controls the operation of the head interfaces for selectively writing data via at least one transducer head, (3) a servo write mode in which the mode controller controls the operation of the head interfaces for selectively writing data via multiple transducer heads, and (4) a read-while-write (RWW) mode in which the mode controller controls the operation of the head interfaces for selectively reading data from at least one recording surface via at least one transducer head while writing data to at least one recording surface via at least one transducer head.

The configuration information can be set, for instance, to the RWW mode for selectively reading data from at least one recording surface via at least one transducer head while simultaneously writing data to multiple recording surfaces via multiple transducer heads.

The configuration information can also be set, for instance, to the servo write mode and the RWW mode for selectively reading data from at least one recording surface via at least one transducer head while writing servo patterns to at least one recording surface via at least one transducer head.

The present invention also provides disk drive self-servo writing by transferring a reference pattern to a reference disk. The reference pattern includes (1) a servo clock that provides transducer head circumferential relative position information, and (2) servo position information that provides transducer head radial relative position information. The reference disk and one or more data disks are installed into the disk drive. Then, during self-servo write, the reference pattern is read from the reference disk via a transducer head and the read servo clock and the servo position information are used to position and maintain one or more transducer heads at concentric tracks on one or more recording surfaces to simultaneously write servo patterns on the recording surfaces. Advantageously, rather than read the reference pattern from the reference disk via a transducer head sequentially followed by switching to other transducer heads to write the servo patterns on the data disks, as is conventional, the reference pattern is read via one transducer head to simultaneously clock out the servo patterns via the other transducer heads. Therefore, there is no need to switch-out the reference pattern to write the servo patterns.

BRIEF DESCRIPTION OF THE DRAWINGS

These and other features, aspects and advantages of the present invention will become understood with reference to the following description, appended claims and accompanying figures where:

FIG. 13 shows a flow diagram for self-servo write;

To facilitate understanding, identical reference numerals have been used, at times with suffixes A, B, and so on, to designate structurally/functionally identical or similar elements that are common throughout the figures.

DESCRIPTION OF THE INVENTION

Figure 1:
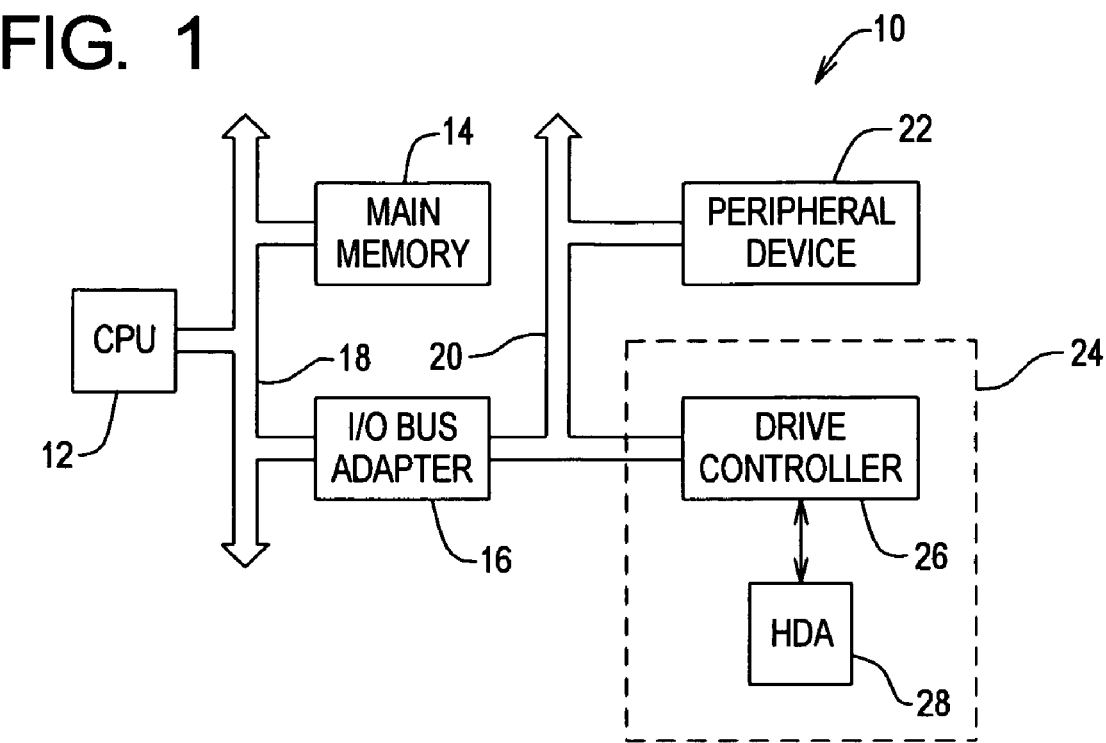
FIG. 1 shows a computer system that includes a disk drive.

FIG. 1 shows a computer system 10 that includes a central processing unit (CPU) 12, a main memory 14, an I/O bus adapter 16, a system bus 18, an I/O bus 20, a peripheral device 22 and a disk drive 24. The CPU 12, the main memory 14 and the I/O bus adapter 16 are connected by the system bus 18, and the I/O bus adapter 16 is connected to the peripheral device 22 and the disk drive 24 by the I/O bus 20 (such as a SCSI bus). The disk drive 24 includes a drive controller 26 and a head disk assembly (HDA) 28.

Figure 2:
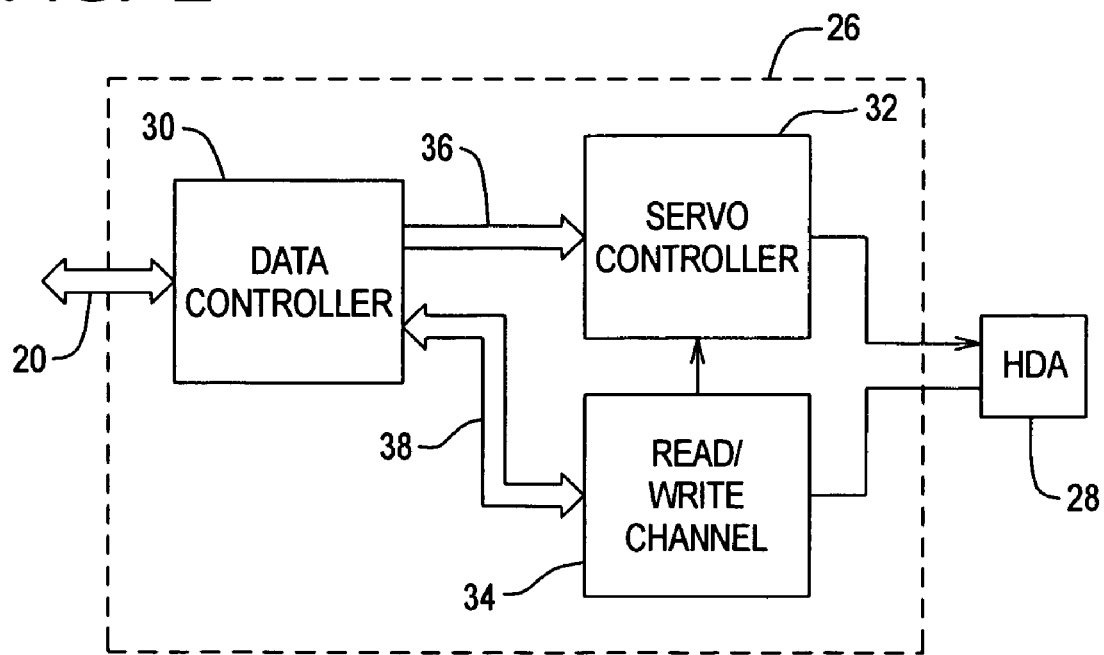
FIG. 2 shows a drive controller of the disk drive.

FIG. 2 shows the drive controller 26 in more detail. The drive controller 26 includes a data controller 30, a servo controller 32, a read/write channel 34, a bus 36 and a data buffer bus 38. The data controller 30 is connected to the servo controller 32 by the bus 36, and the data controller 30 is connected to the channel 34 by the data buffer bus 38. The data controller 30 is also connected to the I/O bus 20, and the servo controller 32 and the channel 34 are connected to the HDA 28. The drive controller 26 also includes a printed circuit board (not shown) that carries large scale integrated circuits and other components.

Figure 3:
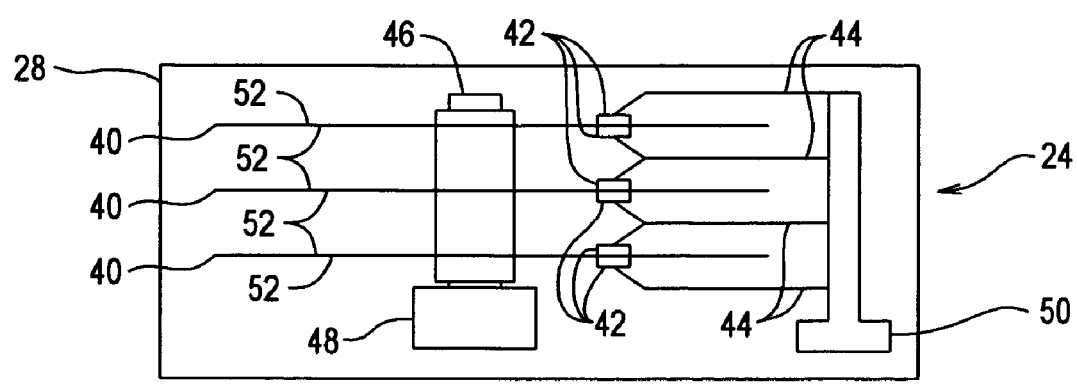
FIG. 3 shows a head disk assembly of the disk drive.

FIG. 3 shows the HDA 28 in more detail. The HDA 28 includes the disks 40, the transducer heads 42, the carrier arms 44, the hub 46, the spindle motor 48 and the actuator 50. The disks 40 are mounted on the hub 46 and rotated by the spindle motor 48. The transducer heads 42 are supported by the carrier arms 44 and moved radially across the disks 40 by the actuator 50 (such as a voice coil motor). The disks 40 include the disk surfaces 52, and the transducer heads 42 read from and write to the corresponding disk surfaces 52.

During a typical read operation, the CPU 12 requests data from the disk drive 24, and the data is transferred from the disk 40 to the CPU 12. The data controller 30 provides a track where the data is stored to the servo controller 32. The servo controller 32 provides control signals to the HDA 28 to command the actuator 50 to position the transducer head 42 over the track where the data is stored in a seek operation. The transducer head 42 reads the data from the disk 40 and generates an analog read signal, the channel 34 converts the read signal into digital data, the data controller 30 transfers the data to the I/O bus 20, and the I/O bus adapter 16 routes the data from the I/O bus 20 to the main memory 14 via the system bus 18 for access by the CPU 12.

The transducer head 42 also reads servo patterns from the disk 40 and generates an analog read signal, the channel 34 converts the read signal into head position information, and the servo controller 32 uses the head position information for seek and track-following operations.

During a typical write operation, the CPU 12 requests that data be stored in the disk drive 24, and the data is transferred from the CPU 12 to the disk 40. For example, with direct memory access (DMA), the I/O bus adapter 16 routes the data from the main memory 14 to the data controller 30 via the buses 18 and 20. The data controller 30 formats the data into blocks with appropriate headers, the channel 34 converts the data into analog form suitable for writing, and the transducer head 42 writes the data to the disk 40.

Figure 4A:
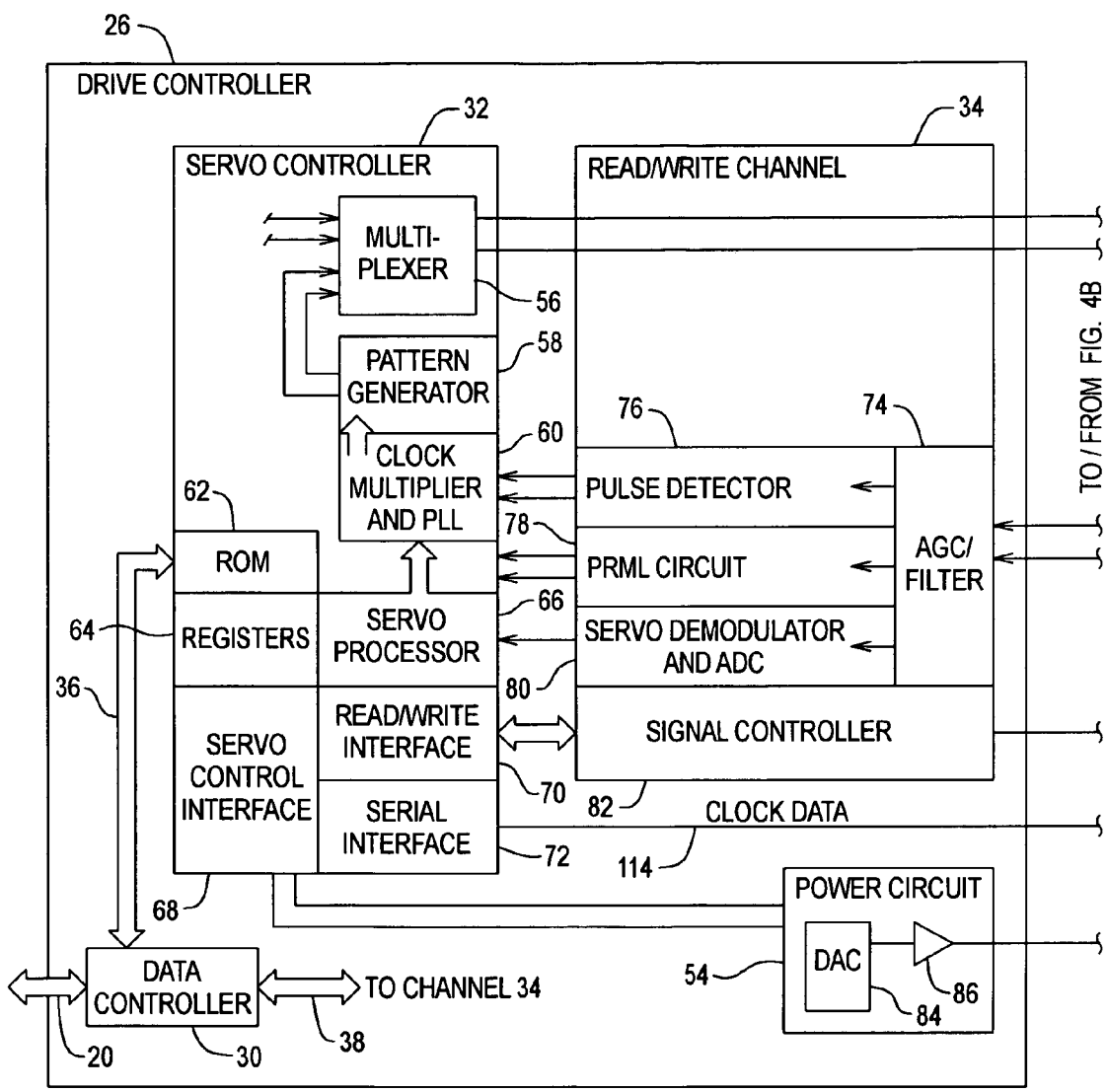
FIGS. 4A–4B show the drive controller and the head disk assembly in more detail.
Figure 4B:
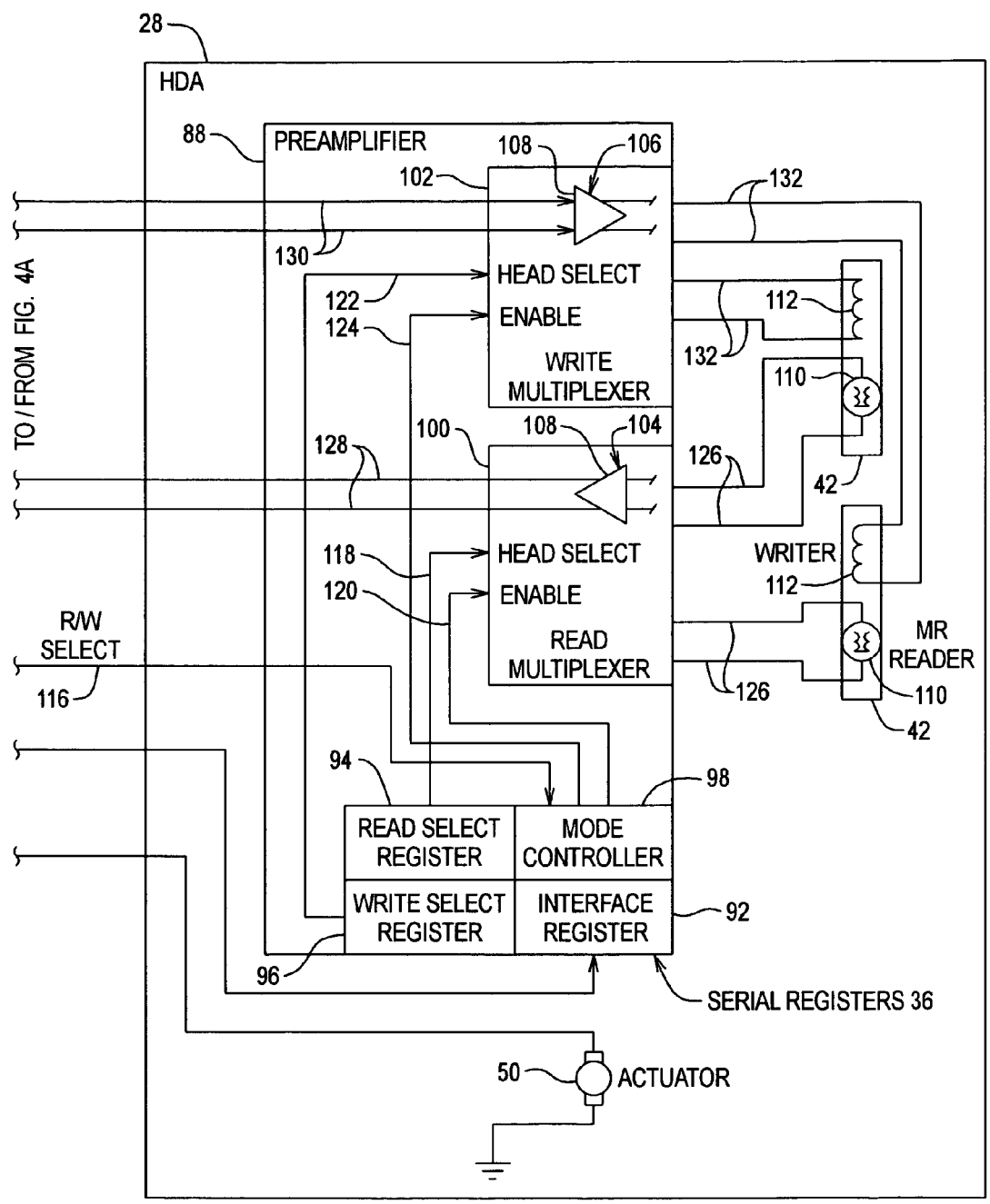

FIGS. 4A–4B show the drive controller 26 and the HDA 28 in more detail.

The drive controller 26 includes a power circuit 54. The servo controller 32 includes a multiplexer 56, a pattern generator 58, a clock multiplier (state machine) and phase locked loop (PLL) 60, a read only memory (ROM) 62, the registers 64, a servo processor 66, a servo control interface 68, a read/write interface 70 and a serial interface 72. The channel 34 includes an automatic gain control (AGC)/filter 74, a pulse detector 76, a partial response maximum likelihood (PRML) circuit 78, a servo demodulator and analog-to-digital converter (ADC) 80 and a signal controller 82. The power circuit 54 includes a digital-to-analog converter (DAC) 84 and a driver 86.

The HDA 28 includes a preamplifier 88 that amplifies the read signal sent from the transducer heads 42 during a read operation and amplifies the write current sent to the transducer heads 42 during a write operation. The preamplifier 88 also selects the transducer heads 42 for the read and write operations based on configuration information sent from the drive controller 26. The configuration information includes head selection and data transfer mode information that selectively configures the preamplifier 88 for independent control of the transducer heads 42.

The preamplifier 88 includes a mode controller 90 that receives and maintains the configuration information. The mode controller 90 includes an interface register 92, a read select register 94, a write select register 96 and a mode register 98. The registers 92, 94 and 96 are serial registers. The mode controller 90 receives the configuration information as an external state signal such as a serial word from the data controller 30, the servo controller 32 and/or the channel 34.

The preamplifier 88 also includes a read multiplexer 100 and a write multiplexer 102. The read multiplexer 100 includes the read circuits 104, and the write multiplexer 102 includes the write circuits 106. The read circuits 104 each include a tri-state differential receiver and buffer, and the write circuits 106 each include a tri-state differential driver and buffer. The read circuits 104 and the write circuits 106 can also provide additional signal processing. The read circuits 104 and the write circuits 106 are arranged in pairs such that one read circuit 104 and one write circuit 106 are connected to a single transducer head 42. In this manner, each read circuit 104 and write circuit 106 pair provides a head interface 108 that controls a corresponding transducer head 42 for read and/or write operations. Alternatively, the read multiplexer 100 can include one read circuit 104 that is connected to a selected one of the transducer heads 42 by a multiplexer, and the write multiplexer 102 can include one write circuit 106 that is connected to a selected one of the transducer heads 42 by a multiplexer.

The transducer heads 42 each include an MR reader 110 and a writer 112.

The interface register 92 input is connected to the clock/data line 114, and the mode controller 90 input is connected to the read/write (R/W) select line 116. The read multiplexer 100 head select input is connected to the read select register 94 by the read head select line 118, and the read multiplexer 100 enable input is connected to the mode register 98 by the read enable line 120. Likewise, the write multiplexer 102 head select input is connected to the write select register 96 by the write head select line 122, and the write multiplexer 102 enable input is connected to the mode register 98 by the write enable line 124. The reader circuit 104 input is connected to the corresponding MR reader 110 by the read data lines 126, and the reader circuit 104 output is connected to the differential read data lines 128 which are inverted with respect to each other to improve noise immunity. Likewise, the writer circuit 106 input is connected to the differential write data lines 130 which are inverted with respect to each other to improve noise immunity, and the writer circuit 106 output is connected to the corresponding writer 112 by the write data lines 132.

The drive controller 26 sends the configuration information to the mode controller 90 using the clock/data line 114 and/or the R/W select line 116. The lines 114 and 116 are serial lines, and the R/W select line 116 toggles a R/W signal between read (high) and write (low). The configuration information received by the mode controller 90 sets selection bits in the read select register 94 and the write select register 96 to designate the selected read circuits 104 and write circuits 106, respectively. The mode register 98 accesses the read select register 94 and the write select register 96 to selectively enable and disable the read circuits 104 and the write circuits 106 based on the configuration information.

The mode controller 90 selects one or more of the transducer heads 42 for read/write operations via the head interfaces 108 based on the configuration information. The mode controller 90 also ascertains the individual operating modes of the transducer heads 42, the read circuits 104 and the write circuits 106 at any given time.

Figure 5A:
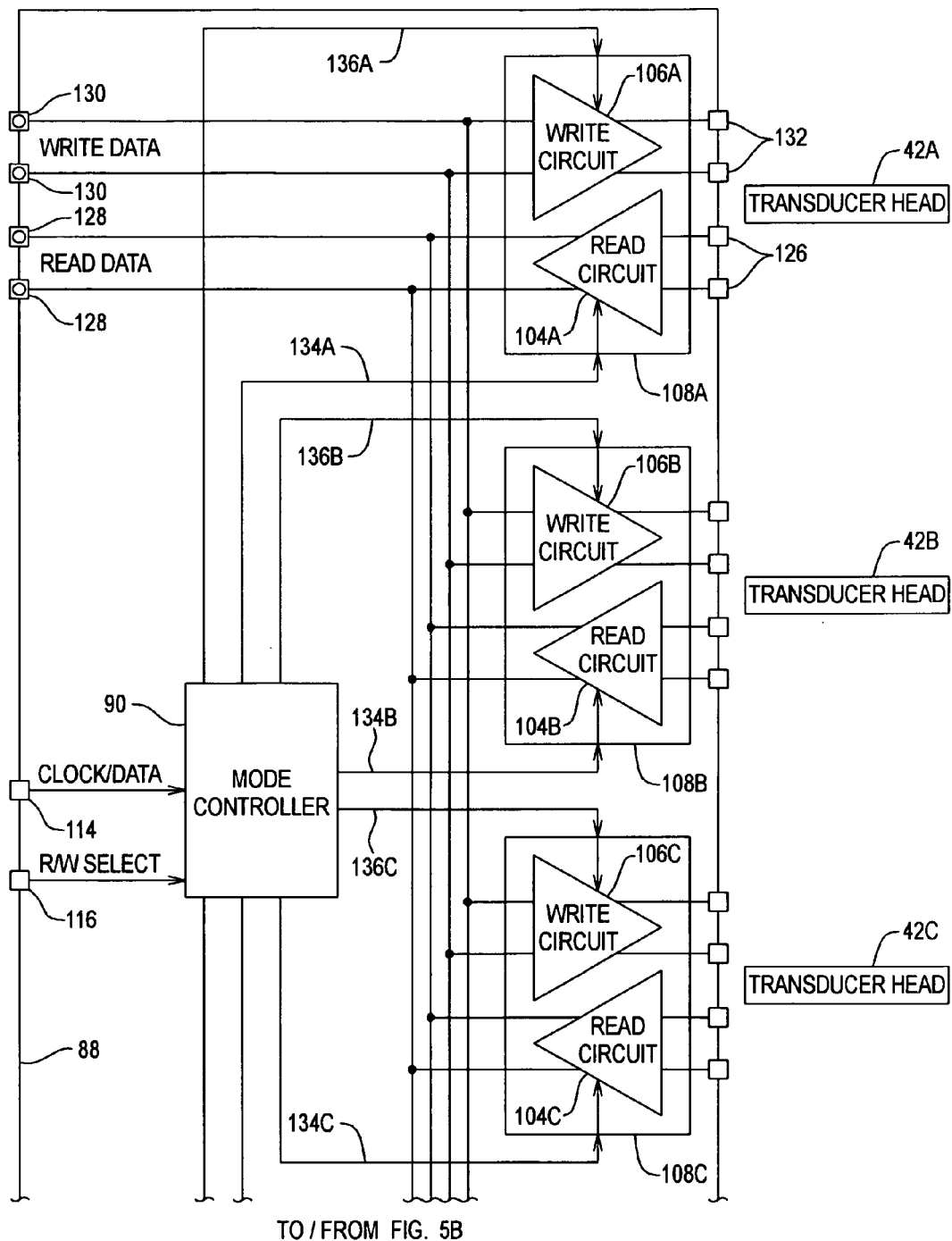
FIGS. 5A–5B show a preamplifier of the head disk assembly.
Figure 5B:
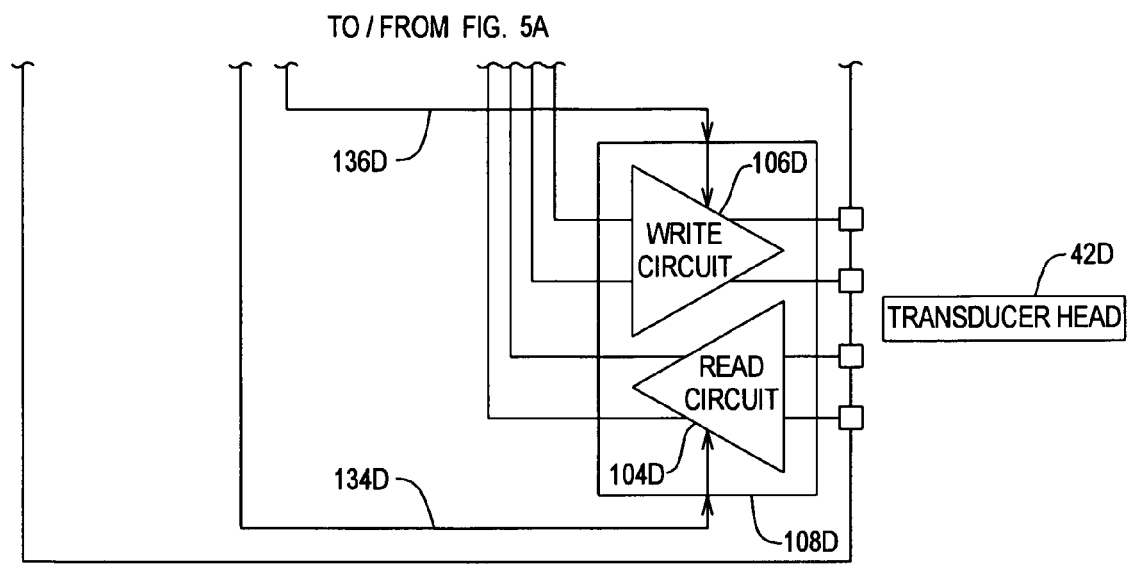

FIGS. 5A–5B show the preamplifier 88 in more detail. The preamplifier 88 includes the head interfaces 108A, 108B, 108C and 108D. The head interfaces 108A, 108B, 108C and 108D are connected to and control the read/write operations of the transducer heads 42A, 42B, 42C and 42D, respectively. The head interface 108A includes the read circuit 104A and the write circuit 106A, the head interface 108B includes the read circuit 104B and the write circuit 106B, the head interface 108C includes the read circuit 104C and the write circuit 106C, and the head interface 108D includes the read circuit 104D and the write circuit 106D. For convenience of illustration, more head interfaces 108 are not shown.

The mode controller 90 in this embodiment implements the multiplexer functions of the read multiplexer 100 and the write multiplexer 102 to provide separate controls lines for each read circuit 104 and write circuit 106. The mode controller 90 enables and disables the read circuits 104A, 104B, 104C and 104D using the read control lines 134A, 134B, 134C and 134D, respectively, and enables and disables the write circuits 106A, 106B, 106C and 106D using the write control lines 136A, 136B, 136C and 136D, respectively. As a result, the transducer heads 42A, 42B, 42C and 42D are individually controlled for read and/or write operations.

The configuration information includes several functional/operational modes: (1) a read mode, (2) a write mode, (3) a servo write mode, and (4) a read-while-write (RWW) mode.

In the read mode, the mode controller 90 controls the head interfaces 108 for selectively reading data from at least one of the disk surfaces 52 via at least one of the corresponding transducer heads 42. In a typical read operation, the mode controller 90 selects one transducer head 42 for reading from the corresponding disk surface 52. Accordingly, the mode controller 90 enables the read circuit 104 for the selected transducer head 42, disables the write circuit 106 for the selected transducer head 42 and disables the read circuits 104 and the write circuits 106 for the other transducer heads 42.

In the write mode, the mode controller 90 controls the head interfaces 108 for selectively writing data from at least one of the transducer heads 42 to at least one of the corresponding disk surfaces 52. In a typical write operation, the mode controller 90 selects one transducer head 42 for writing to the corresponding disk surface 52. Accordingly, the mode controller 90 enables the write circuit 106 for the selected transducer head 42, disables the read circuit 104 for the selected transducer head 42 and disables the read circuits 104 and the write circuits 106 for the other transducer heads 42.

In the servo write mode, the mode controller 90 controls the head interfaces 108 for selectively writing servo patterns from at least one of the transducer heads 42 to at least one of the corresponding disk surfaces 52. For example, the mode controller 90 selects multiple transducer heads 42 for writing servo patterns to the corresponding disk surfaces 52 simultaneously or in overlapping form but does not select any transducer head 42 for reading since the read and write operations are gated by the R/W signal and therefore are mutually exclusive.

In the read-while-write (RWW) mode, the mode controller 90 controls the head interfaces 108 for simultaneously (1) selectively reading data from at least one of the disk surfaces 52 via at least one of the corresponding transducer heads 42, and (2) selectively writing data from at least one of the transducer heads 42 to at least one of the corresponding disk surfaces 52. For example, the mode controller 90 selects one transducer head 42 for reading and writing. As another example, the mode controller 90 selects one transducer head 42 for reading and another transducer head 42 for writing. As another example, the mode controller 90 selects one transducer head 42 for reading and other transducer heads 42 for writing.

The servo write mode and the RWW mode can be used together. For example, the configuration information is pre-programmed and stored in the ROM 62. The servo processor 66 sends the configuration information from the ROM 62 to the interface register 92 via the serial interface 72 and the clock/data line 114. Alternatively, the servo processor 66 sends the head selection information to the interface register 92 via the serial interface 70 and the clock/data line 114, and the servo processor 66 sends the data transfer mode information to the mode controller 90 via the read/write interface 70, the signal controller 82 and the R/W select line 116. The configuration information sets a control bit in the interface register 92 to place the mode controller 90 in the servo write mode. The configuration information also sets one bit in the read select register 94 to select one transducer head 42 for reading and two bits in the write select register 96 to select two transducer heads 42 for writing. The mode register 98 then commands the read selected transducer head 42 to read and the write selected transducer heads 42 to write, and the read and write operations are performed simultaneously.

The disk drive 24 can self-servo write when the preamplifier 88 is configured for the servo write mode and the RWW mode. For example, the disk drive 24 reads a reference pattern from one disk surface 52 using one transducer head 42 while writing servo patterns to one or more blank disk surfaces 52 using one or more other transducer heads 42. The reference pattern provides position and timing information for writing the servo patterns. As a result, the disk drive 24 self-servo writes with the absolute reference that a servo writer offers. The disk drive 24 can self-servo write in a variety of ways, including a bank write and a stagger write. Likewise, the reference pattern can be provided on the disk surface 52 in a variety of ways, including magnetic printing (printed media) and spin stand writing.

Figure 6:
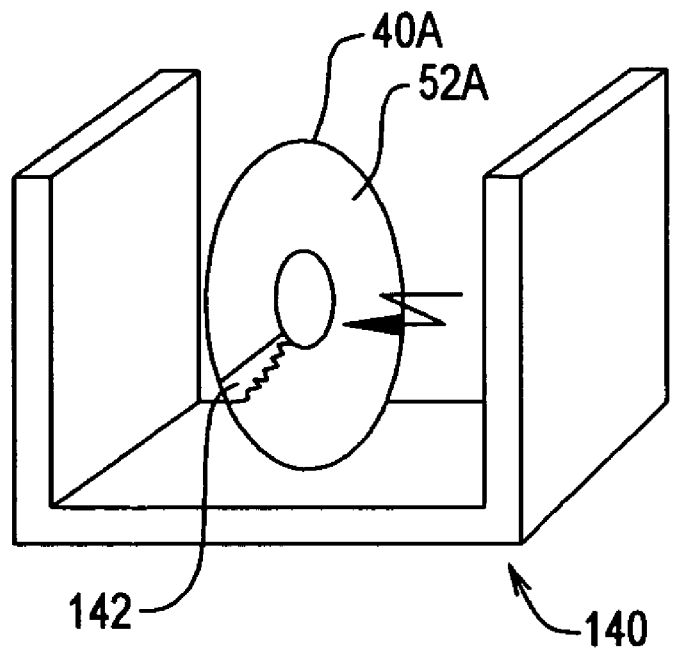
FIG. 6 shows a magnetic printing station that prints a reference pattern on a reference disk.

FIG. 6 shows a magnetic printing station 140 that magnetically prints a reference pattern 142 on the reference disk 40A using a magnetic transfer process. The reference disk 40A is initially blank. The magnetic printing station 140 then applies a unidirectional magnetic domain orientation to the reference disk 40A. Next, a reticle or magnetic die with the reference pattern 142 is placed in close proximity to the reference disk 40A, the reference disk 40A is heated to approach the Curie temperature of its storage media, and the reference disk 40A is selectively remagnetized at the disk surface 52A with the aid of a reverse bias field and localized heating to provide the reference pattern 142 on disk surface 52A in accordance with the reference pattern 142 established by the reticle or die. Alternatively, if an optical reticle is used, a laser beam causes intense local heating through reticle apertures to provide magneto-optic selective domain magnetization at the disk surface 52A. In any case, the reference pattern 142 is printed on the reference disk 40A at the disk surface 52A.

Care must be taken during the magnetic printing process not to damage or contaminate the reference disk 40A. Preferably, the magnetic printing process occurs in a very clean environment within the disk manufacturing process.

Figure 7:
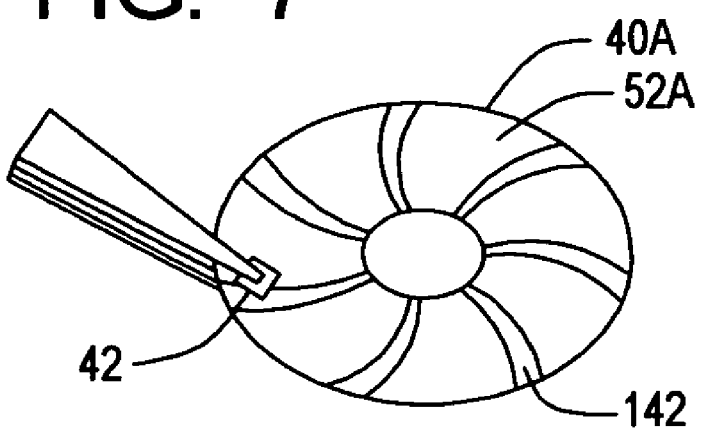
FIG. 7 shows the reference pattern.

FIG. 7 shows the reference pattern 142. The reference pattern 142 includes circumferentially spaced spokes that extend radially from the inner diameter (ID) to the outer diameter (OD) of the reference disk 40A.

Figure 8:
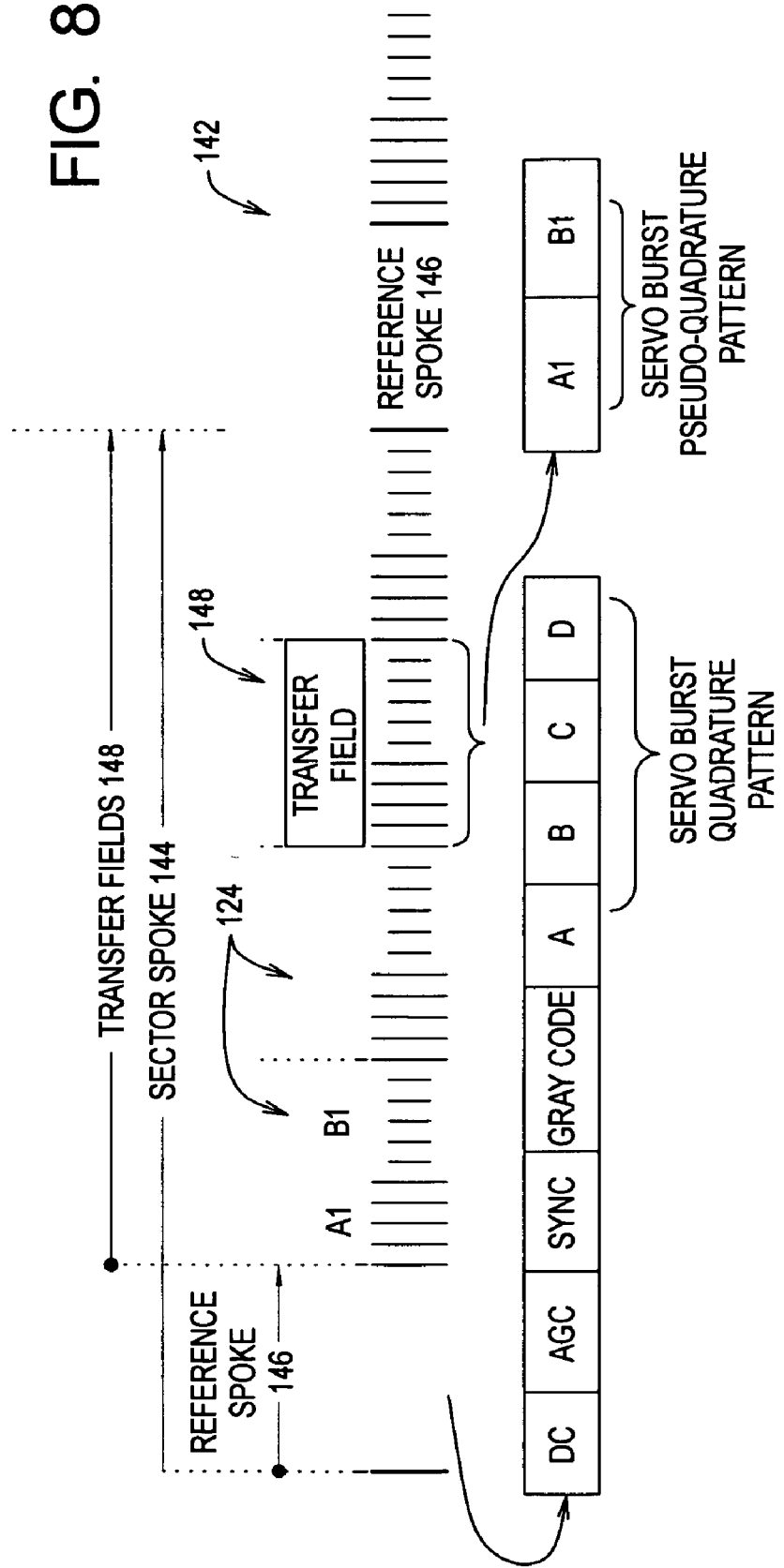
FIG. 8 shows the reference pattern in more detail.

FIG. 8 shows the reference pattern 142 in more detail. The reference pattern 142 includes the sector spokes 144 that each include a single reference spoke 146 and multiple transfer fields 148. Thus, the adjacent reference spokes 146 are separated by multiple transfer fields 148.

The reference spokes 146 each include a DC field, an AGC field, a sync field, a gray code field and a servo burst quadrature pattern field. The gray code includes binary coded location by cylinder number that provides coarse head position information, and the servo burst quadrature pattern includes A, B, C and D servo bursts that provide fine head position information. The transfer fields 148 each include a servo burst pseudo-quadrature pattern field with A1 and B1 servo bursts that provide fine head position information. The gray code is used for long (coarse) seeks, the gray code and the servo burst quadrature pattern are used for short (fine) seeks and track-following, and the A1 and B1 servo bursts are used for track-following maintenance between the reference spokes 146. Furthermore, the gray code and the servo burst quadrature pattern provide absolute position information.

The reference spokes 146 have the same circumferential length (time) as the transfer fields 148. Furthermore, the reference spokes 146 and the transfer fields 148 provide position and timing information (transfer timing) for self-servo write. The transfer timing can be embedded to create the transfer fields 148 on another disk surface 52 for overwriting the reference spokes 146 with the (final) servo patterns, and the transfer timing fundamental frequency can be 10 t where 1 t is the bit cell of the servo patterns.

Figure 9:
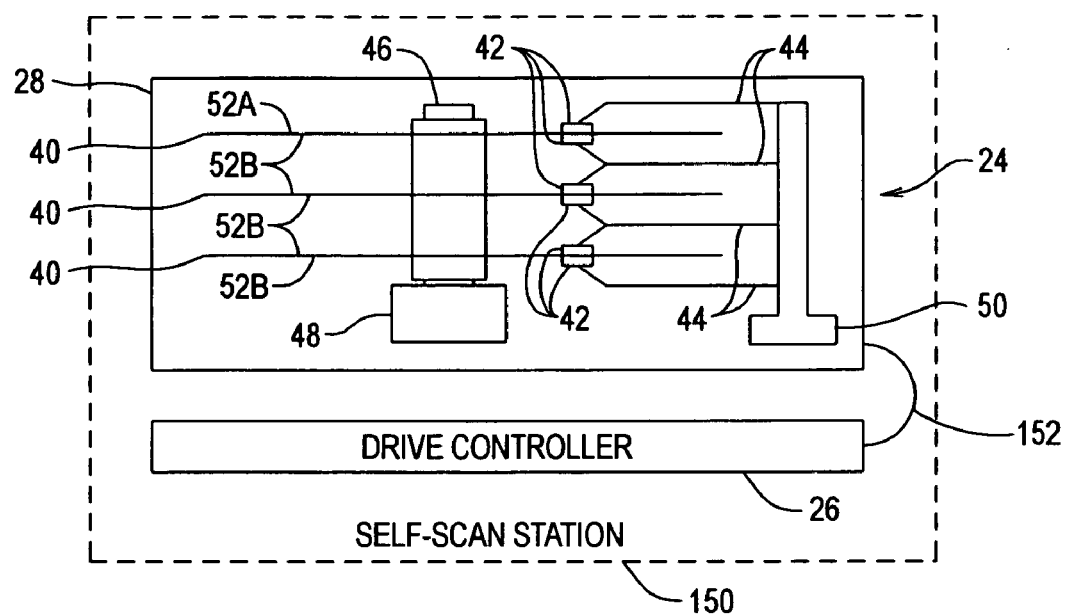
FIG. 9 shows the disk drive with the reference pattern in a self-scan station before self-servo write.

FIG. 9 shows the disk drive 24 in a self-scan station 150 after the disk drive 24 is assembled and before self-servo write. The disks 40 include the reference disk 40A and the data disks 40B, and the disk surfaces 52 include the disk surface 52A and the disk surfaces 52B. The disk surface 52A is the top surface of the reference disk 40A, and the disk surfaces 52B are the bottom surface of the reference disk 40A and the top and bottom surfaces of the data disks 40B. At this stage, the disk surface 52A includes the reference pattern 142 and the disk surfaces 52B are blank. Thus, the data disks 40B are blank.

The disk drive 24 is assembled before it is placed in the self-scan station 150. The magnetic printing station 140 prints the reference pattern 142 on the reference disk 40A, and then the reference disk 40A and the data disks 40B are assembled onto the hub 46. After the disks 40 and the transducer heads 42 are installed in the HDA 28, the HDA 28 is enclosed by a cover to prevent unwanted particulate contamination. The drive controller 26 is mechanically attached to the HDA 28 and is electrically connected to the HDA 28 by a suitable interconnection 152 to complete the assembly of the disk drive 24.

The disk drive 24 is then placed in the self-scan station 150 which provides a stable mounting structure, thermal stability, a suitable power supply and an interface bus. A personal computer (not shown) downloads test firmware into the disk drive 24, and a control and status collection computer (not shown) collects data on the disk drive 24 during self-scan procedures. In addition, the drive controller 26 contains a self-servo write program that enables the disk drive 24 to self-servo write precise final servo patterns while the disk drive 24 is in the self-scan station 150. The self-servo write program is resident in the ROM 62 or downloaded from the control and status collection computer.

Figure 10:
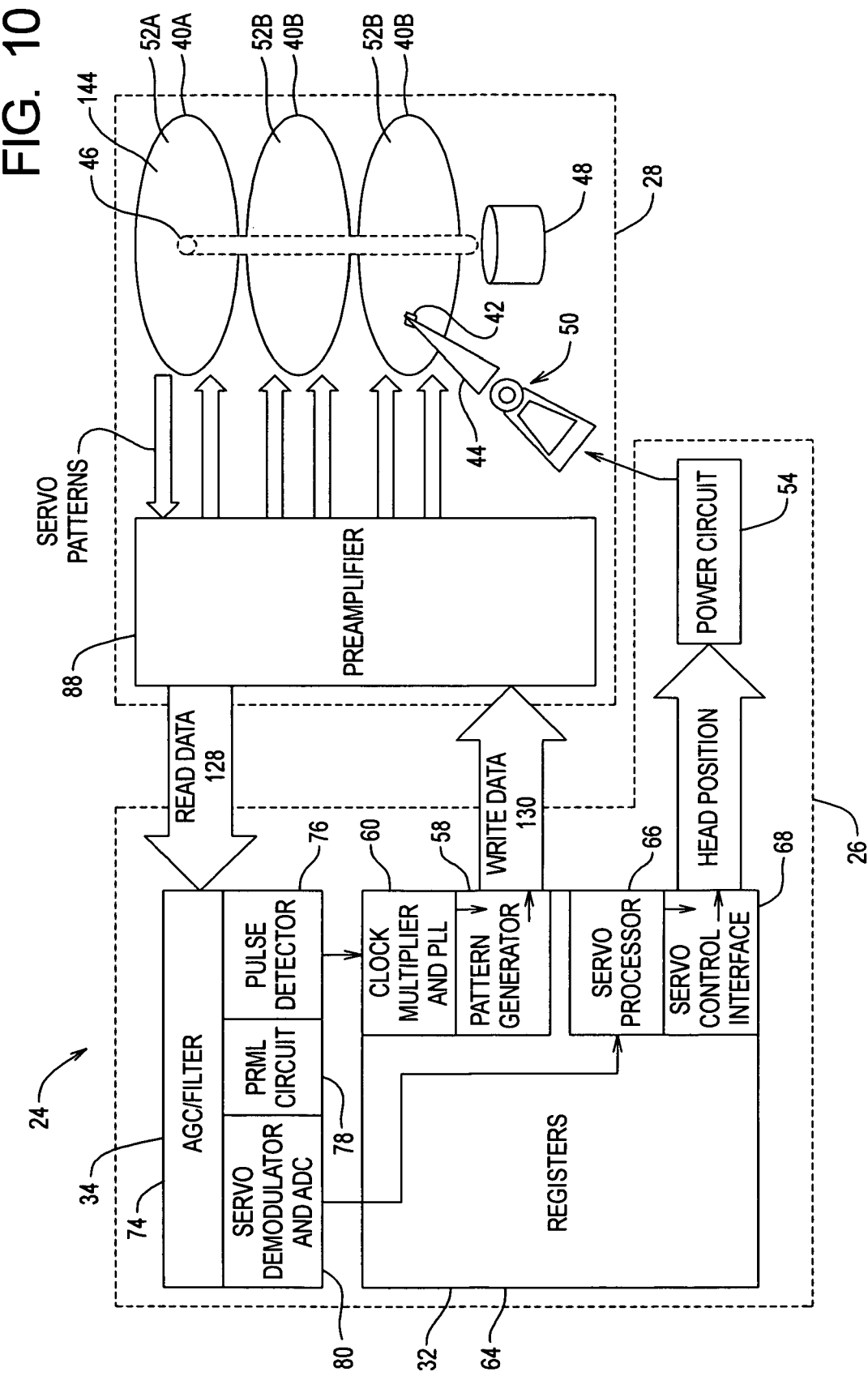
FIG. 10 shows the disk drive performing self-servo write.

FIG. 10 shows self-servo write by the disk drive 24. The drive controller 26 sends configuration information to the preamplifier 88 that designates the servo write mode and the RWW mode, selects the transducer head 42 corresponding to the disk surface 52A for reading and selects the other transducer heads 42 for writing. The read selected transducer head 42 reads the reference pattern 142 from the disk surface 52A and generates a read signal that includes circumferential position information and radial position information for the transducer heads 42, thereby providing an absolute reference for the transducer heads 42. The servo processor 66 uses the position information to position the transducer heads 42, and the pattern generator 58 uses the position information to generate the servo patterns. As the read selected transducer head 42 reads the reference pattern 142 from the disk surface 52A, the servo processor 66 positions the transducer heads 42, the pattern generator 58 generates the servo patterns and the other transducer heads 42 write the servo patterns to the disk surfaces 52B. Thus, the reference pattern 142 is read while the servo patterns are written.

Advantageously, the reference pattern 142 enables the servo processor 66 to recalibrate timing and position for the transducer heads 42 before each servo pattern write, thereby using real-time position and timing information to write the servo patterns as cohesive cylindrical servo wedges on the disk surfaces 52B, and avoiding timing/speed variations that occur between conventional switched-out servo read and write operations. The reference pattern 142 also enables the pattern generator 58 to simultaneously clock out the servo patterns in the same manner as a clock track.

Figure 11:
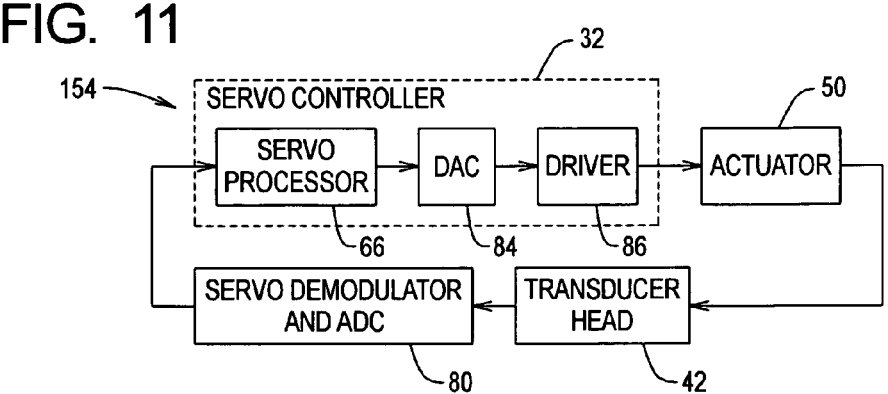
FIG. 11 shows a head position servo loop of the disk drive.

FIG. 11 shows a head position servo loop 154 of the disk drive 24. The read selected transducer head 42 generates a read signal that includes position and timing information in response to reading the reference pattern 142. The servo demodulator and ADC 80 resolves the position and timing information in the read signal and provides a position signal that indicates the current position of the transducer head 42. The servo processor 66 subtracts the position signal from a desired head position to provide a modified position signal based on the difference. The DAC 84 converts the modified position signal into an analog position signal that the driver 86 uses to drive the actuator 50. The head position servo loop 154 is used during self-servo write to maintain accurate position control of the transducer heads 42 over the disk surfaces 52.

Figure 12:
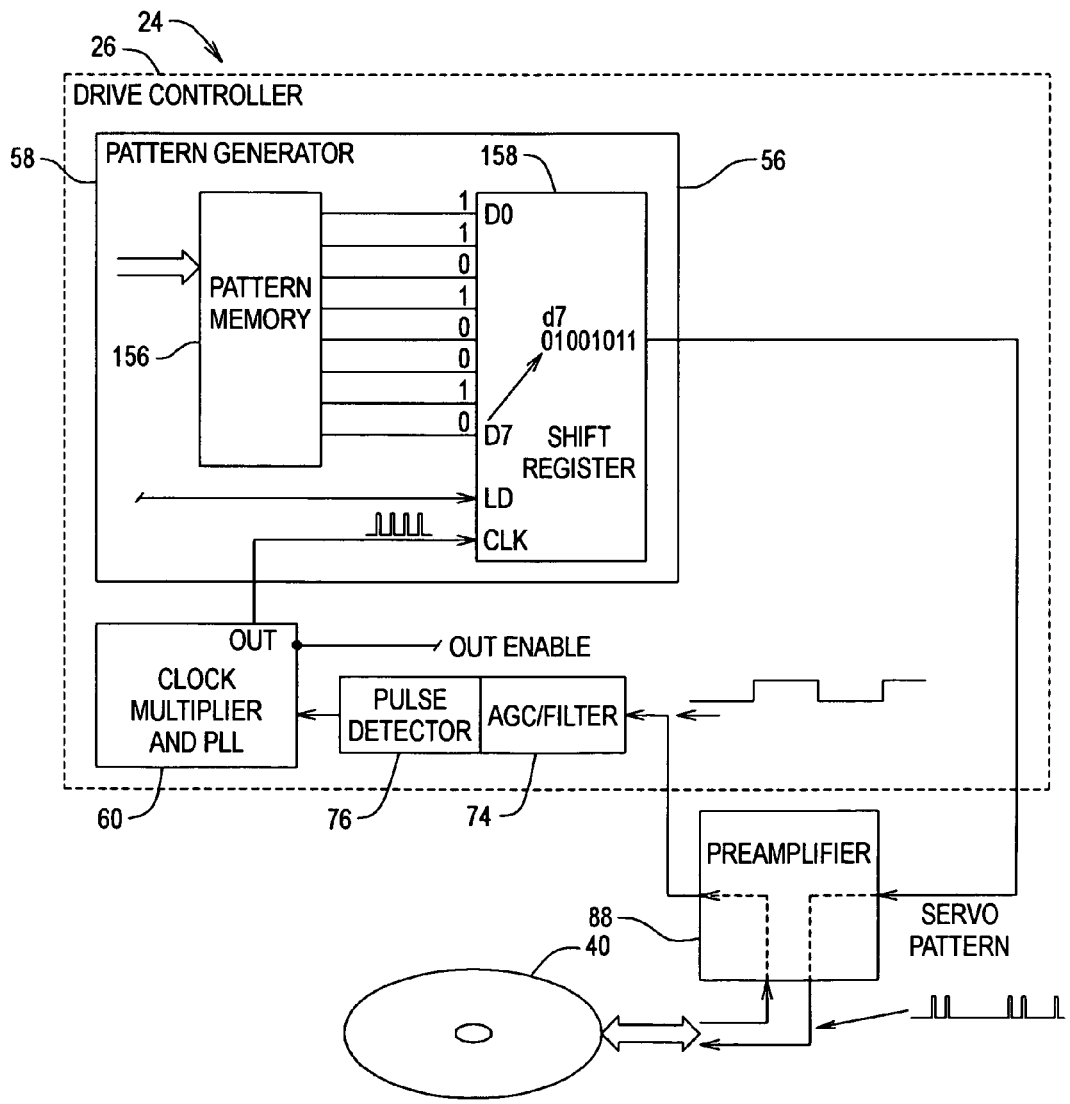
FIG. 12 shows the disk drive generating servo patterns for self-servo write.

FIG. 12 shows the disk drive 24 generating the servo patterns for self-servo write. The pattern generator 58 includes a pattern memory 156 and a shift register 158. The pattern memory is a random access memory (RAM), and the shift register 158 is a serial shift register with parallel load.

The mode controller 90 selects the transducer head 42 for reading the reference pattern 142 from the disk surface 52A and the transducer heads 42 for writing the servo patterns to the disk surfaces 52B in response to configuration information from the servo processor 66. The read selected transducer head 42 generates a read signal by reading the reference pattern 142 on the disk surface 52, and the read signal is sequentially processed by the preamplifier 88, the AGC/filter 74 and the pulse detector 76. The clock multiplier and PLL 60 phase locks on the read signal from the pulse detector 76 based on the timing frequency of the transfer fields 148 and clocks the shift register 158 at the maximum servo pattern frequency. As a result, the servo patterns are synchronously clocked to rotational speed variations of the disks 40.

The servo processor 66 provides track-to track positioning and track following for the transducer heads 42 using the reference spokes 146, and provides track-following maintenance between the reference spokes 146 using the transfer fields 148.

When the read selected transducer head 42 stabilizes over a starting position on the disk surface 52A, the pattern memory 156 loads the servo pattern into the shift register 158 as a series of 1's and 0's, and the servo pattern generation sequence begins. Thus, the servo positioning operates simultaneously with the servo pattern generation and self-servo write.

FIG. 13 shows a flow diagram for self-servo write. In this example, the disk drive 24 includes one reference disk 40A and three data disks 40B, and therefore one disk surface 52A (on the reference disk 40A) that includes the reference pattern 142 and seven disk surfaces 52B (on the reference disk 40A and the data disks 40B) that are blank. Likewise, the disk drive 24 includes one transducer head 42 corresponding to the disk surface 52A and seven transducer heads 42 corresponding to the disk surfaces 52B. In addition, the reference pattern 142 includes the reference spokes 146 each followed by seven transfer fields 148.

During self-servo write, the (final) servo patterns 160 are written to the disk surfaces 52B in a stagger pattern. The reference spoke 146 is read to position the transducer heads 42, then the servo pattern 160 is written on the first disk surface 52B as the first transfer field 148 following the reference spoke 146 is read to position the transducer heads 42, then the servo pattern 160 is written on the second disk surface 52B as the second transfer field 148 following the reference spoke 146 is read to position the transducer heads 42, and so on, until the seventh servo pattern 160 is written on the seventh disk surface 52B as the seventh transfer field 148 following the reference spoke 146 is read to position the transducer heads 42. The process then repeats for the next reference spoke 146 and transfer fields 148.

The final servo patterns 160 are arranged in a stagger pattern in which sequential servo spokes are offset from one disk surface 52B to the next. Furthermore, position error due to disk flapping can be updated as a transducer head 42 writes to a disk surface 52B by another transducer head 42 that reads the servo patterns from the opposite disk surface 52B. Likewise, a transducer head 42 can provide track centering as another transducer head 42 writes the servo patterns 160.

Figure 14A:
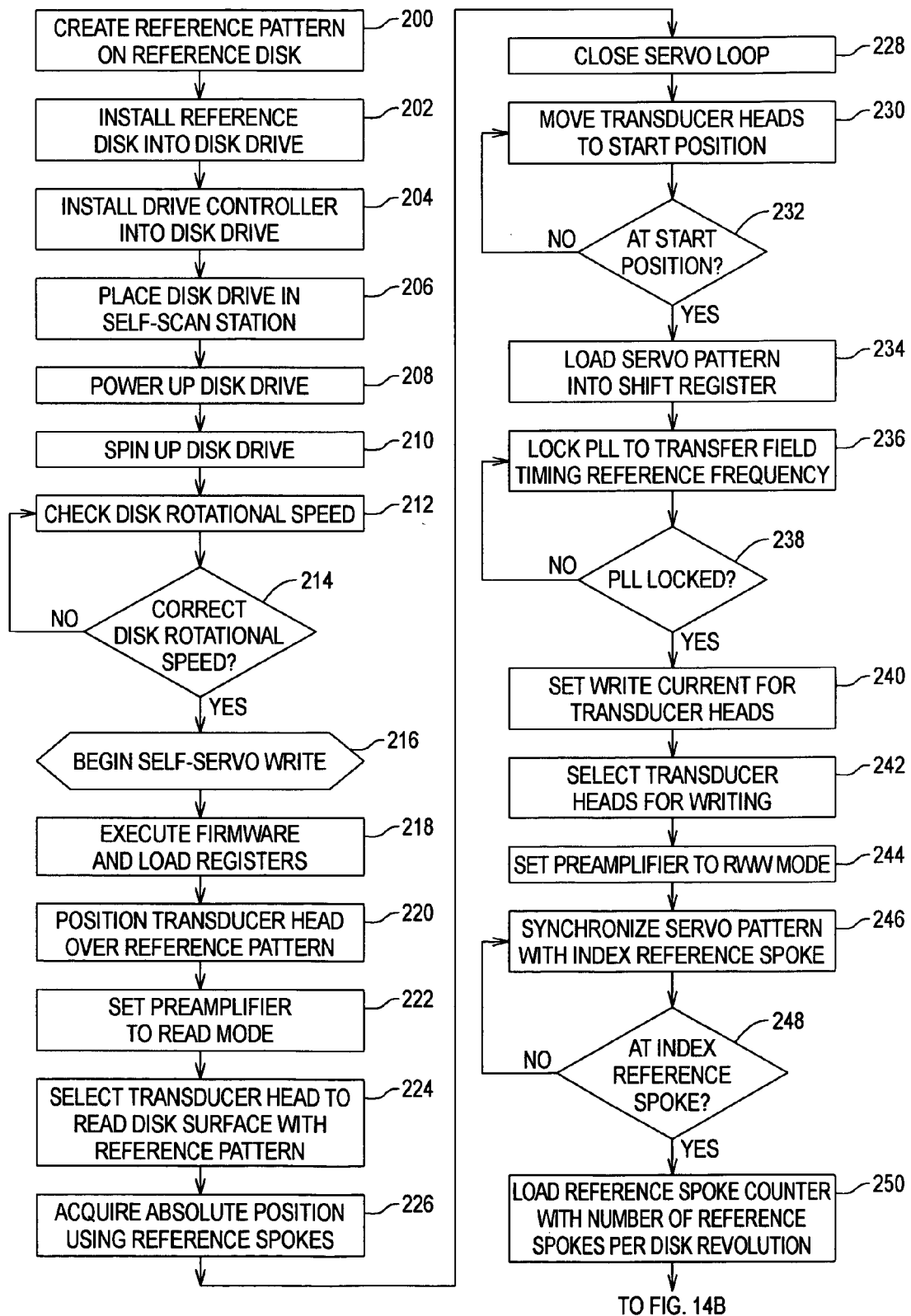
FIGS. 14A–14B show a flow chart for self-servo write.
Figure 14B:
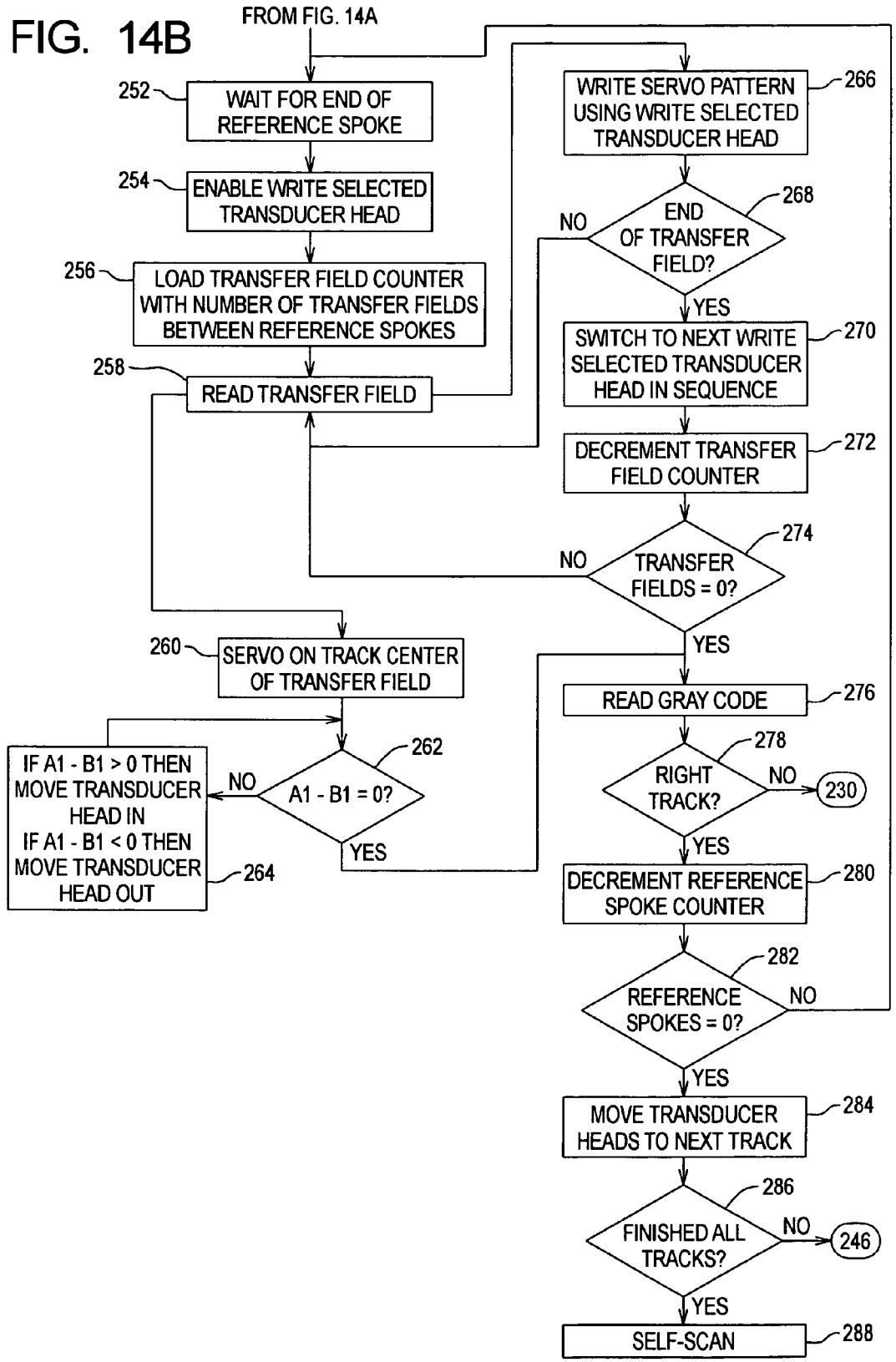

This example includes the following parameters:
Sector spoke density=100 sector spokes per revolution
Reference spoke density=1 reference spoke per sector spoke
Transfer field density=7 transfer fields per sector spoke
Disk rotational speed=6000 rpm=10 mS per revolution
Sector spoke time=(10 mS)/(100 sector spokes)=100 uS per sector spoke
Reference spoke time=(sector spoke time)/8=12.5 uS per reference spoke
Transfer field time=(sector spoke time)/8=12.5 uS per transfer field FIGS. 14A–14B show a flowchart for self-servo write by the disk drive 24.

The reference pattern 142 is printed on the reference disk 40A (step 200), the reference disk 40A is installed into the disk drive 24 (step 202), the drive controller 26 is installed into the disk drive 24 (step 204), and after the assembly is complete, the disk drive 24 is placed in the self-scan station 150 (step 206). The disk drive 24 is powered up (step 208) and spins up (step 210) to a programmed disk rotational speed (steps 212 and 214), and then self-servo write begins (step 216).

The servo processor 66 controls self-servo write by executing instructions (firmware) resident in the ROM 62, and the registers 64 are loaded with the number of spokes, number of heads, number of transfer fields, number of tracks, length of spokes, length of transfer fields, head width and other pertinent information (step 218). The transducer heads 42 are moved to position the transducer head 42 corresponding to the disk surface 52A over the reference pattern 142 (step 220), and the servo processor 66 sends configuration information to the mode controller 90 that sets the preamplifier 88 in the read mode (step 222) and selects the transducer head 42 corresponding to the disk surface 52A for reading (step 224).

The servo processor 66 waits for a pattern sequence that initiates a servo lock attempt, and if the data follows as expected, the initial servo lock occurs and the absolute position is attempted to be acquired by reading the gray code of the reference spoke 146 (step 226). Once the absolute position is acquired, the head position servo loop 154 is closed (step 228) and moves the transducer heads 42 to the start position for reading the reference pattern 142 from the disk surface 52A and writing the servo patterns to the disk surfaces 52B (steps 230 and 232).

When the read selected transducer head 42 is stabilized over the starting position on the disk surface 52A, the pattern memory 156 loads the servo pattern into the shift register 158 and the servo pattern generation sequence begins (step 234). The clock multiplier and PLL 60 phase locks to the timing reference frequency of the transfer fields 148 (steps 236 and 238). Thereafter, in response to the configuration information from the servo processor 66, the mode controller 90 sets the write currents for the transducer heads 42 (step 240) and selects the transducer heads 42 for writing the servo patterns to the disk surfaces 52B (step 242). The mode controller 90 receives configuration information that sets the preamplifier 88 to the RWW Mode (step 244) and the servo pattern is synchronized with the index reference spoke 146 (steps 246 and 248). A reference spoke counter is loaded with the number of reference spokes 146 per revolution of the disk 40A (step 250). When the read selected transducer head 42 reaches the end of a reference spoke 146 (step 252), a write selected transducer head 42 is enabled (step 254), a transfer field counter within the registers 64 is loaded with the number of transfer fields 148 between each pair of reference spokes 146 (step 256) and the read selected transducer head 42 reads the transfer field 148 (step 258).

The servo positioning (steps 260–264) occurs simultaneously with the servo pattern generation and self-servo write (steps 266–274).

After reading the transfer field 148 (step 258), the transducer heads 42 are maintained on the track center (on-track) of the transfer field 148 (step 260) by reading the amplitudes of the A1 and B1 servo bursts in the transfer pattern 148, determining the difference between the amplitudes (step 262) and adjusting the position of the transducer heads 42 based on the difference (step 264). Steps 262 and 264 are repeated to maintain the transducer heads 42 on the track center of the transfer field 148.

After reading the transfer field 148 (step 258), and while servo positioning the transducer heads 42, the servo pattern is written by the write selected transducer head 42 to the corresponding disk surface 52B (step 266) until the end of the transfer field 148 (step 268). Thereafter, the next write selected transducer head 42 is switched to (step 270) and the transfer field counter is decremented by one (step 272) to determine whether all the transfer fields 148 between the pair of reference spokes 146 have been read (step 274). If not, the process returns to step 258 and the next transfer field 148 is read.

Once the transducer heads 42 are on-track (step 262) and all the transfer fields 148 between the pair of reference spokes 146 have been read (step 274) the gray code in the reference spoke 146 is read (step 276) to determine whether the transducer heads 42 are at the proper track (step 278). If not, the process returns to step 230 to position the transducer heads 42 at the proper track, otherwise the reference spoke counter is decremented by one (step 280) to determine whether all the reference spokes 146 on the current track have been read (step 282). If not, the process returns to step 252 to read the next reference spoke 146, otherwise the transducer heads 42 are moved to the next track (step 284) to determine whether all the tracks have been written to (step 286). If not, the process returns to step 246, otherwise the process proceeds to self-scan (step 288).

Figure 15:
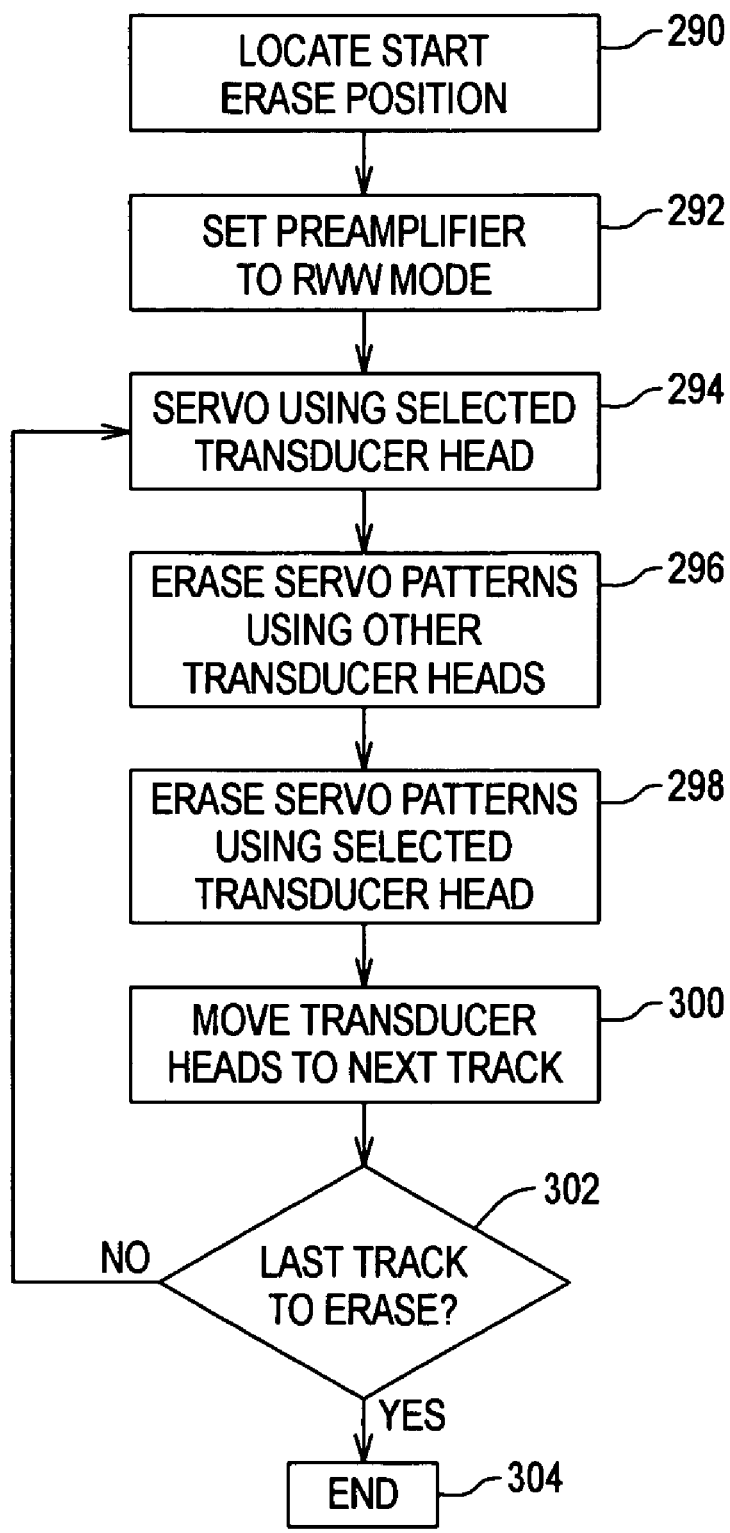
FIG. 15 shows a flow diagram for self-reprocessing faulty servo patterns.

FIG. 15 shows a flow chart for self-reprocessing faulty servo patterns by the disk drive 24. A controlled velocity read sweep across the disk surfaces 52 locates erroneous servo patterns (step 290). The servo processor 66 sends configuration information to the mode controller 90 that sets the preamplifier 88 in the RWW mode (step 292). Then a selected transducer head 42 reads position information from the corresponding disk surface 52 to provide servo positioning (step 294) while other transducer heads 42 erase the servo patterns on the corresponding disk surfaces 52 in bank or stagger form (step 296). Thereafter, the selected transducer head 42 erases the servo patterns on the corresponding disk surface 52 (step 298) and then the transducer heads 42 are moved to the next track to be erased (step 300). If this track is the last track to be erased (step 302) then the process terminates (step 304), otherwise the process returns to step 294.

The disk drive 24 can perform self-reprocessing using a single transducer head 42 by reading the servo patterns with the MR reader 110 to provide servo positioning while simultaneously writing with the writer 112 to erase the servo patterns using a constant DC erase current that does not disturb the read signal. The MR reader 110 is in front of the writer 112 so that the servo patterns are read before being erased.

The preamplifier 88 provides the disk drive 24 with cost-efficient capability to perform self-servo writing, self-reprocessing, disk flapping negation while writing, track-centering while writing and calculating position error before transducer head switches.

The preamplifier 88 can be implemented as an integrated circuit, ASIC or firmware. In addition, the functions of the preamplifier 88 can be implemented in other components of the disk drive 24.

The configuration information can be sent from the disk controller 26 to the mode controller 90 in a variety of ways. For example, the servo processor 66 can send the configuration information from the ROM 62 to the interface register 92 via the serial interface 70 and the clock/data line 114 with the read and write operations gated by the R/W select line 116. In another example, the servo processor 66 can send the configuration information as a serial word on the R/W select line 116.

The channel 34 can be have its read circuitry independently selectable to be active or inactive during write operations, thereby providing independent operation of its read and write paths and supporting simultaneous read and write data streams.

The present invention has been described in considerable detail with reference to certain preferred versions thereof, however other versions are possible. Therefore, the spirit and scope of the appended claims should not be limited to the description of the preferred versions contained herein.

What is claimed is:

1. A disk drive comprising:
   a recording media having one or more recording surfaces;
   one or more transducer heads;
   an actuator for positioning the transducer heads relative to the recording surfaces, operating within a head position servo loop;
   a preamplifier comprising:
      one or more head interfaces, each head interface electrically connected to a transducer head for controlling the transducer head for data read and/or write operations; and
      a mode controller electrically connected to each head interface for controlling the operation of each head interface based on configuration information for selectively reading data from at least one recording surface via at least one transducer head while writing final servo patterns to at least another recording surface via at least one transducer head; and
   a drive controller for controlling the actuator to position the transducer heads relative to the recording surfaces, and for providing the configuration information to the mode controller for selectively reading data from at least one recording surface via at least one transducer head while writing final servo patterns to at least another recording surface via at least one transducer head.

2. The disk drive of claim 1 wherein the configuration information includes head selection and data transfer mode information.

3. The disk drive of claim 1 wherein the configuration information is a serial word.

4. The disk drive of claim 1 wherein each head interface comprises:
   a read circuit for controlling the corresponding transducer head to read data from a recording surface, and
   a write circuit for controlling the corresponding transducer head to write data to a recording surface.

5. The disk drive of claim 1 wherein the mode controller further controls the operation of the head interfaces based on the configuration information for writing data to a recording surface via a selected transducer head while reading data from the recording surface via the selected transducer head.

6. A data transfer driver for a data storage device including recording media having one or more recording surfaces, and one or more transducer heads positionable relative to the recording surfaces by an actuator operating within a head position servo loop, the data transfer driver comprising:
   one or more head interfaces, each head interface electrically connected to a transducer head for controlling the transducer head for data read and/or write operations; and
   a mode controller electrically connected to each head interface for controlling the operation of each head interface for selectively reading data from at least one recording surface while simultaneously writing data to a plurality of recording surfaces.

7. A disk drive comprising:
   a recording media having one or more recording surfaces;
   one or more transducer heads;
   an actuator for positioning the transducer heads relative to the recording surfaces, operating within a head position servo loop;
   a preamplifier comprising:
      one or more head interfaces, each head interface electrically connected to a transducer head for controlling the transducer head for data read and/or write operations; and
      a mode controller electrically connected to each head interface for controlling the operation of each head interface based on configuration information for selectively reading data from at least one recording surface via at least one transducer head while simultaneously writing data to a plurality of recording surfaces via a plurality of transducer heads; and
   a drive controller for controlling the actuator to position the transducer heads relative to the recording surfaces, and for providing the configuration information to the mode controller.

8. A data transfer driver for a data storage device including recording media having one or more recording surfaces, and one or more transducer heads positionable relative to the recording surfaces by an actuator operating within a head position servo loop, the data transfer driver comprising:
   one or more head interfaces, each head interface electrically connected to a transducer head for controlling the transducer head for data read and/or write operations; and
   a mode controller electrically connected to each head interface, wherein the mode controller controls the operation of the head interfaces based on configuration information including:
      a read mode, wherein the mode controller controls the operation of the head interfaces for selectively reading data via at least one transducer head;
      a write mode, wherein the mode controller controls the operation of the head interfaces for selectively writing data via at least one transducer head;

a servo write mode, wherein the mode controller controls the operation of the head interfaces for selectively writing data via a plurality of transducer heads; and a read-while-write (RWW) mode, wherein the mode controller controls the operation of the head interfaces for selectively reading data from at least one recording surface via at least one transducer head while writing data to at least one recording surface via at least one transducer head.

9. A disk drive comprising:

a recording media having one or more recording surfaces;

one or more transducer heads;

an actuator for positioning the transducer heads relative to the recording surfaces, operating within a head position servo loop;

a preamplifier comprising:
one or more head interfaces, each head interface electrically connected to a transducer head for controlling the transducer head for data read and/or write operations; and a mode controller electrically connected to each head interface for controlling the operation of each head interface based on configuration information for selectively reading data from at least one recording surface via at least one transducer head while writing data to at least one recording surface via at least one transducer head; and a drive controller for controlling the actuator to position the transducer heads relative to the recording surfaces, and for providing the configuration information to the preamplifier for selectively reading data from at least one recording surface via at least one transducer head while writing data to at least one recording surface via at least one transducer head;

wherein the configuration information includes head selection and data transfer mode information comprising:

a read mode, wherein the mode controller controls the operation of the head interfaces for selectively reading data via at least one transducer head;

a write mode, wherein the mode controller controls the operation of the head interfaces for selectively writing data via at least one transducer head;

a servo write mode, wherein the mode controller controls the operation of the head interfaces for selectively writing data via a plurality of transducer heads; and a read-while-write (RWW) mode, wherein the mode controller controls the operation of the head interfaces for selectively reading data from at least one recording surface via at least one transducer head while writing data to at least one recording surface via at least one transducer head.

10. A data transfer driver for a data storage device including recording media having one or more recording surfaces, and one or more transducer heads positionable relative to the recording surfaces by an actuator operating within a head position servo loop, the data transfer driver comprising:

one or more head interfaces, each head interface electrically connected to a transducer head for controlling the transducer head for data read and/or write operations; and a mode controller electrically connected to each head interface for controlling the operation of each head interface for selectively reading data from at least one recording surface via at least one transducer head while writing data to a plurality of recording surfaces via a plurality of transducer heads.

11. A data transfer driver for a data storage device including recording media having one or more recording surfaces, and a plurality of transducer heads positionable relative to the recording surfaces by an actuator operating within a head position servo loop, the data transfer driver comprising:

a plurality of head interfaces, each head interface electrically connected to a corresponding transducer head for controlling that transducer head for data read and/or write operations; and a mode controller electrically connected to each head interface for controlling the operation of each head interface based on configuration information for selectively reading data from at least one recording surface while writing data to a plurality of recording surfaces.

12. The data transfer driver of claim 11 wherein the configuration information includes head selection and data transfer mode information.

13. The data transfer driver of claim 11 wherein each head interface comprises:

a read circuit for controlling the corresponding transducer head to read data from a recording surface; and a write circuit for controlling the corresponding transducer head to write data to a recording surface.

14. The data transfer driver of claim 11 wherein the mode controller controls the operation of the head interfaces based on the configuration information for writing data to a recording surface via a selected transducer head while reading data from the recording surface via the selected transducer head.

15. The data transfer driver of claim 11 wherein the mode controller controls the operation of the head interfaces based on the configuration information for writing data to at least one recording surface via at least one transducer head while reading data from at least one recording surface via at least another transducer head.

16. A data transfer driver for a disk drive including one or more magnetic data disks having one or more recording surfaces, and one or more transducer heads positionable relative to the recording surfaces by an actuator operating within a head position servo loop, the data transfer driver comprising:

one or more head interfaces, each head interface electrically connected to a transducer head for controlling the transducer head for data read and/or write operations; and a mode controller electrically connected to each head interface for controlling the operation of each head interface for selectively reading data from at least one recording surface via at least one transducer head for a distance longer than a servo sector while writing data to at least one recording surface via at least one transducer head.

17. A disk drive comprising:

one or more data disks having one or more recording surfaces;

a reference disk having a reference pattern thereon, wherein the reference pattern comprises a servo clock providing transducer head circumferential relative position information, and servo position information providing transducer head radial relative position information;

one or more transducer heads;
an actuator for positioning the transducer heads relative to the recording surfaces, operating within a head position servo loop;
a preamplifier comprising:
one or more head interfaces, each head interface electrically connected to a transducer head for controlling the transducer head for data read and/or write operations; and
a mode controller electrically connected to each head interface for controlling the operation of each head interface based on configuration information for selectively reading data from at least one recording surface via at least one transducer head while writing data to at least another recording surface via at least one transducer head; and
a drive controller for controlling the actuator to position the transducer heads relative to the recording surfaces, for providing the configuration information to the mode controller for selectively reading data from at least one recording surface via at least one transducer head while writing data to at least another recording surface via at least one transducer head, for controlling the actuator and the preamplifier in a servo control loop, for reading the reference pattern from the reference disk via a transducer head and for using the read servo clock and servo position information to position and maintain one or more other transducer heads on one or more recording surfaces while writing final servo patterns onto one or more recording surfaces.

18. The disk drive of claim 17 wherein the drive controller controls the actuator and the preamplifier for:
reading the reference pattern from the reference disk via a transducer head and using the read servo clock and servo position information to position and maintain one or more other transducer heads on one or more recording surfaces;
while at the same time generating and writing final servo patterns onto one or more recording surfaces.

19. The disk drive of claim 17 wherein the drive controller further comprises:
a pattern generator for generating the final servo patterns for writing to the recording surfaces; and
a servo controller for controlling the actuator and the preamplifier in a servo control loop, for reading the reference pattern from the reference disk via a transducer head and for using the read servo clock and servo position information to position and maintain one or more other transducer heads on one or more recording surfaces while writing the final servo patterns onto one or more recording surfaces.

20. The disk drive of claim 17 wherein the preamplifier is an integrated circuit.

21. The disk drive of claim 17 wherein the preamplifier is an ASIC.

22. The disk drive of claim 17 wherein the configuration information is a state signal sent to and stored in the preamplifier.

23. The disk drive of claim 17 wherein the configuration information is a serial word sent to and stored in the preamplifier.

24. The disk drive of claim 17 wherein the data disks are blank until writing the final servo patterns.

25. The disk drive of claim 17 wherein the drive controller provides the configuration information to the mode controller for reading the final servo patterns from a recording surface via a transducer head and to position and maintain one or more other transducer heads on the reference disk while writing final servo patterns onto the reference disk.

26. The disk drive of claim 25 wherein the final servo patterns overwrite the reference pattern.

27. A disk drive comprising:
first and second disk surfaces;
first and second heads, wherein the first head reads from and writes to the first disk surface, and the second head reads from and writes to the second disk surface; and
a preamplifier that controls read and write operations for the heads based on configuration information, wherein the configuration information provides head selection and data transfer mode information that includes (1) a read mode in which each selected head reads from a corresponding disk surface, (2) a write mode in which each selected head writes to a corresponding disk surface, (3) a servo write mode in which each selected head writes final servo patterns to a corresponding disk surface, and (4) a read-while-write (RWW) mode in which each read selected head reads from a corresponding disk surface while each write selected head writes to a corresponding disk surface.

28. The disk drive of claim 27 wherein the disk surfaces are on a single disk.

29. The disk drive of claim 27 wherein the disk surfaces are on separate disks.

30. The disk drive of claim 27 wherein the preamplifier is an integrated circuit.

31. The disk drive of claim 27 wherein the preamplifier is an ASIC.

32. The disk drive of claim 27 wherein the configuration information is a state signal sent to and stored in the preamplifier.

33. The disk drive of claim 27 wherein the configuration information is a serial word sent to and stored in the preamplifier.

34. The disk drive of claim 27 wherein the configuration information selects the RWW mode such that the first head reads longer than a servo sector from the first disk surface while the second head writes to the second disk surface.

35. The disk drive of claim 27 wherein the configuration information selects the RWW mode such that the first head reads other than a servo sector from the first disk surface while the second head writes to the second disk surface.

36. The disk drive of claim 27 wherein the configuration information selects the RWW mode such that the first head reads a temporary reference pattern from the first disk surface while the second head writes to the second disk surface.

37. The disk drive of claim 27 wherein the configuration information selects the servo write mode and the RWW mode such that the disk drive self-servo writes as the first head reads from the first disk surface to position the first and second heads while the second head writes the final servo patterns to the second disk surface.

38. The disk drive of claim 37 wherein the first head reads a reference pattern from the first disk surface to position the first and second heads while the second head writes the final servo patterns to the second disk surface.

39. The disk drive of claim 38 wherein the reference pattern includes timing and position information.

40. The disk drive of claim 38 wherein the reference pattern includes circumferential position information and radial position information.

41. The disk drive of claim 38 wherein the reference pattern is a printed media pattern.

42. The disk drive of claim 37 wherein the self-servo write is a bank write.

43. The disk drive of claim 37 wherein the self-servo write is a stagger write.

44. The disk drive of claim 37 wherein the self-servo write provides initial information on the second disk surface.

45. The disk drive of claim 37 wherein the configuration information selects the servo write mode and the RWW mode after the second head writes the final servo patterns to the second disk surface such that the disk drive self-servo writes as the second head reads the final servo patterns from the second disk surface to position the first and second heads while the first head writes the final servo patterns to the first disk surface.

46. The disk drive of claim 45 wherein the final servo patterns overwrite the reference pattern.

47. A disk drive comprising:
first and second disk surfaces;
first and second heads, wherein the first head reads from and writes to the first disk surface, and the second head reads from and writes to the second disk surface;
a preamplifier that controls read and write operations for the heads based on configuration information, wherein the configuration information provides head selection and data transfer mode information that includes (1) a read mode in which each selected head reads from a corresponding disk surface, (2) a write mode in which each selected head writes to a corresponding disk surface, and (3) a read-while-write (RWW) mode in which each read selected head reads from a corresponding disk surface while each write selected head writes to a corresponding disk surface; and
a drive controller that sends the configuration information to the preamplifier, wherein the drive controller sets the configuration information to (1) the read mode for read operations, (2) the write mode for write operations, and (3) the RWW mode for self-servo write such that the first head reads a reference pattern from the first disk surface to position the first and second heads while the second head writes final servo patterns to the second disk surface.

48. The disk drive of claim 47 wherein the configuration information is a state signal sent to and stored in the preamplifier.

49. The disk drive of claim 47 wherein the configuration information is a serial word sent to and stored in the preamplifier.

50. The disk drive of claim 47 wherein the reference pattern includes timing and position information.

51. The disk drive of claim 47 wherein the reference pattern includes circumferential position information and radial position information.

52. The disk drive of claim 47 wherein the reference pattern is a printed media pattern.

53. The disk drive of claim 47 wherein the reference pattern is a spin stand written pattern.

54. The disk drive of claim 47 wherein the self-servo write provides initial information on the second disk surface.

55. The disk drive of claim 47 wherein the drive controller sets the configuration information after the final servo patterns are written to the second disk surface to RWW mode for self-servo write such that the second head reads the final servo patterns from the second disk surface to position the first and second heads while the first head writes the final servo patterns to the first disk surface.

56. The disk drive of claim 55 wherein the final servo patterns overwrite the reference pattern.

57. A disk drive comprising:
first and second disk surfaces;
first and second heads, wherein the first head reads from and writes to the first disk surface, and the second head reads from and writes to the second disk surface;
a preamplifier that controls read and write operations for the heads based on configuration information, wherein the configuration information provides head selection and data transfer mode information that includes (1) a read mode in which each selected head reads from a corresponding disk surface, (2) a write mode in which each selected head writes to a corresponding disk surface, and (3) a read-while-write (RWW) mode in which each read selected head reads from a corresponding disk surface while each write selected head writes to a corresponding disk surface; and
a drive controller that sends the configuration information to the preamplifier, wherein the drive controller sets the configuration information to (1) the read mode for read operations, (2) the write mode for write operations, and (3) the RWW mode such that the first head reads from the first disk surface for an entire revolution of the first disk surface while the second head writes to the second disk surface for an entire revolution of the second disk surface.

58. The disk drive of claim 57 wherein the configuration information is a state signal sent to and stored in the preamplifier.

59. The disk drive of claim 57 wherein the configuration information is a serial word sent to and stored in the preamplifier.

60. The disk drive of claim 57 wherein the first head reads longer than a servo sector from the first disk surface while the second head writes to the second disk surface.

61. The disk drive of claim 57 wherein the first head reads other than a servo sector from the first disk surface while the second head writes to the second disk surface.

62. The disk drive of claim 57 wherein the first head reads from the first disk surface that is devoid of final servo patterns while the second head writes to the second disk surface.

63. The disk drive of claim 57 wherein the first head reads from the first disk surface while the second head writes to the second disk surface to provide initial information on the second disk surface.

64. The disk drive of claim 57 wherein the first head reads a reference pattern from the first disk surface that provides circumferential position information and radial position information to position the first and second heads while the second head writes to the second disk surface.

65. The disk drive of claim 57 wherein the first head reads from the first disk surface while the second head writes final servo patterns to the second disk surface.

66. The disk drive of claim 57 wherein the first head reads a reference pattern from the first disk surface that provides circumferential position information and radial position information to position the first and second heads while the second head writes final servo patterns to the second disk surface.

* * * * *